United States Patent
Caprioli

(10) Patent No.: US 9,703,948 B2
(45) Date of Patent: Jul. 11, 2017

(54) RETURN-TARGET RESTRICTIVE RETURN FROM PROCEDURE INSTRUCTIONS, PROCESSORS, METHODS, AND SYSTEMS

(71) Applicant: Intel Corporation, Santa Clara, CA (US)

(72) Inventor: Paul Caprioli, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/229,822

(22) Filed: Mar. 28, 2014

(65) Prior Publication Data
US 2015/0278516 A1  Oct. 1, 2015

(51) Int. Cl.
*G06F 9/44* (2006.01)
*G06F 9/45* (2006.01)
(Continued)

(52) U.S. Cl.
CPC .......... *G06F 21/54* (2013.01); *G06F 9/30145* (2013.01); *G06F 2221/034* (2013.01)

(58) Field of Classification Search
CPC .... G06F 9/4425; G06F 9/45516; G06F 9/443; G06F 9/4426; G06F 9/45508;
(Continued)

(56) References Cited

U.S. PATENT DOCUMENTS 6,766,513 B2 * 7/2004 Charnell ............... G06F 8/4442
711/6

7,080,366 B2 * 7/2006 Kramskoy ............ G06F 8/4442
711/E12.011

(Continued)

FOREIGN PATENT DOCUMENTS

JP  09-198258 A  7/1997
JP  2001-216161 A  8/2001
(Continued)

OTHER PUBLICATIONS

Checkoway et al., Return-oriented programming without returns, Oct. 2010, 14 pages.*
Roemer et al., Return-Oriented Programming: Systems, Languages, and Applications, Mar. 2012, 34 pages.*
Davi et al., ROPdefender: a detection tool to defend against return-oriented programming attacks, Mar. 2011, 12 pages.*
(Continued)

*Primary Examiner* — Thuy Dao
(74) *Attorney, Agent, or Firm* — Vecchia Patent Agent, LLC

(57) ABSTRACT

A processor includes a decode unit to decode a return target restrictive return from procedure (RTR return) instruction. A return target restriction unit is responsive to the RTR return instruction to determine whether to restrict an attempt by the RTR return instruction to make a control flow transfer to an instruction at a return address corresponding to the RTR return instruction. The determination is based on compatibility of a type of the instruction at the return address with the RTR return instruction and based on compatibility of first return target restrictive information (RTR information) of the RTR return instruction with second RTR information of the instruction at the return address. A control flow transfer unit is responsive to the RTR return instruction to transfer control flow to the instruction at the return address when the return target restriction unit determines not to restrict the attempt.

9 Claims, 16 Drawing Sheets

(51) Int. Cl.
*G06F 21/54* (2013.01)
*G06F 9/30* (2006.01)

(58) Field of Classification Search
CPC ........ G06F 8/447; G06F 8/4442; G06F 21/54; G06F 21/52; G06F 11/3612; G06F 11/3636
See application file for complete search history.

(56) References Cited

U.S. PATENT DOCUMENTS

| | | | | |
|---|---|---|---|---|
| 7,552,477 | B1* | 6/2009 | Satish | G06F 9/545 710/260 |
| 7,603,704 | B2* | 10/2009 | Bruening | G06F 21/52 726/22 |
| 8,127,280 | B2* | 2/2012 | Thomas | G06F 8/4442 717/136 |
| 8,776,223 | B2* | 7/2014 | Balakrishnan | G06F 21/54 713/188 |
| 9,122,792 | B2* | 9/2015 | Bates | G06F 11/362 |
| 2005/0138263 | A1* | 6/2005 | McKeen | G06F 21/52 711/1 |
| 2005/0154859 | A1* | 7/2005 | Gilkerson | G06F 9/30054 712/207 |
| 2009/0038008 | A1* | 2/2009 | Pike | G06F 21/52 726/22 |
| 2012/0030758 | A1 | 2/2012 | van den Berg et al. | |
| 2012/0151184 | A1 | 6/2012 | Wilkerson et al. | |
| 2012/0167120 | A1 | 6/2012 | Hentunen | |
| 2013/0185792 | A1 | 7/2013 | Balakrishnan et al. | |

FOREIGN PATENT DOCUMENTS

| | | |
|---|---|---|
| JP | 2009-230479 A | 10/2009 |
| KR | 10-2003-0088892 A | 11/2003 |
| KR | 10-2003-0092264 A | 12/2003 |
| KR | 10-2006-0056998 A | 5/2006 |
| KR | 10-2010-0087357 A | 8/2010 |
| TW | 201220119 A1 | 5/2012 |

OTHER PUBLICATIONS

Combined Search and Examination report received for European Patent Application No. 1500925.1, mailed on Jul. 14, 2015, 7 pages.
Buchanan, et al., "When Good Instructions Go Bad: Generalizing Return-Oriented Programming to RISC", Oct. 2008, 12 pages.
Shacham, Hovav, "The Geometry of Innocent Flesh on the Bone: Return-into-libc without Function Calls (on the x86)", ACM CCS, Oct. 2007, 30 pages.
Bania, Piotr, "Security Mitigations for Return-Oriented Programming Attacks", Kryptos Logic Research, 2010, 8 pages.
Pappas, Vasilis, "kBouncer: Efficient and Transparent ROP Mitigation", Apr. 1, 2012, 8 pages.
"Intel 64 and IA-32 Architectures Software Developer's Manual", vol. 2 (2A, 2B &2C): Instruction Set Reference, A-Z, Intel, Order No. 325383-041US, Dec. 2011, 15 pages.
Office Action received for Taiwanese Patent Application No. 104105065, mailed on Apr. 20, 2016, 24 pages of Office Action including 13 pages of English Translation.
Notice of Allowance received for Japanese Patent Application No. 2015-005715 , mailed on Apr. 26, 2016, 1 page of Notice of Allowance only.
Office Action received for Korean Patent Application No. 10-2015-0026812, mailed on Jan. 15, 2016, 4 pages of English Translation and 5 pages of Korean Office Action.
Wikipedia, "Return-Oriented Programming", From Wikipedia, the free encyclopedia, retrieved from web on Feb. 6, 2014, 5 pages.
Wang, et al., "Jekyll on iOS: When Benign Apps Become Evil", USENIX Association, 22nd USENIX Security Symposium, Aug. 14-16, 2013, 14 pages.
Dai Zovi, Dino A., "Practical Return-Oriented Programming", Funemployed Security Researcher, 2010, 68 pages.
Notice of Allowance received for Korean Patent Application No. 10-2015-0026812, mailed on Oct. 7, 2016, 2 pages of Korean Notice of Allowance.
Office Action Received for United Kingdom Patent Application No. 1500925.1 , mailed on Sep. 21, 2016, 2 pages.
Office Action and Search report received for Taiwanese Patent Application No. 104105065, mailed on Nov. 28, 2016, 19 pages of Office Action including 10 pages of English Translation.

\* cited by examiner

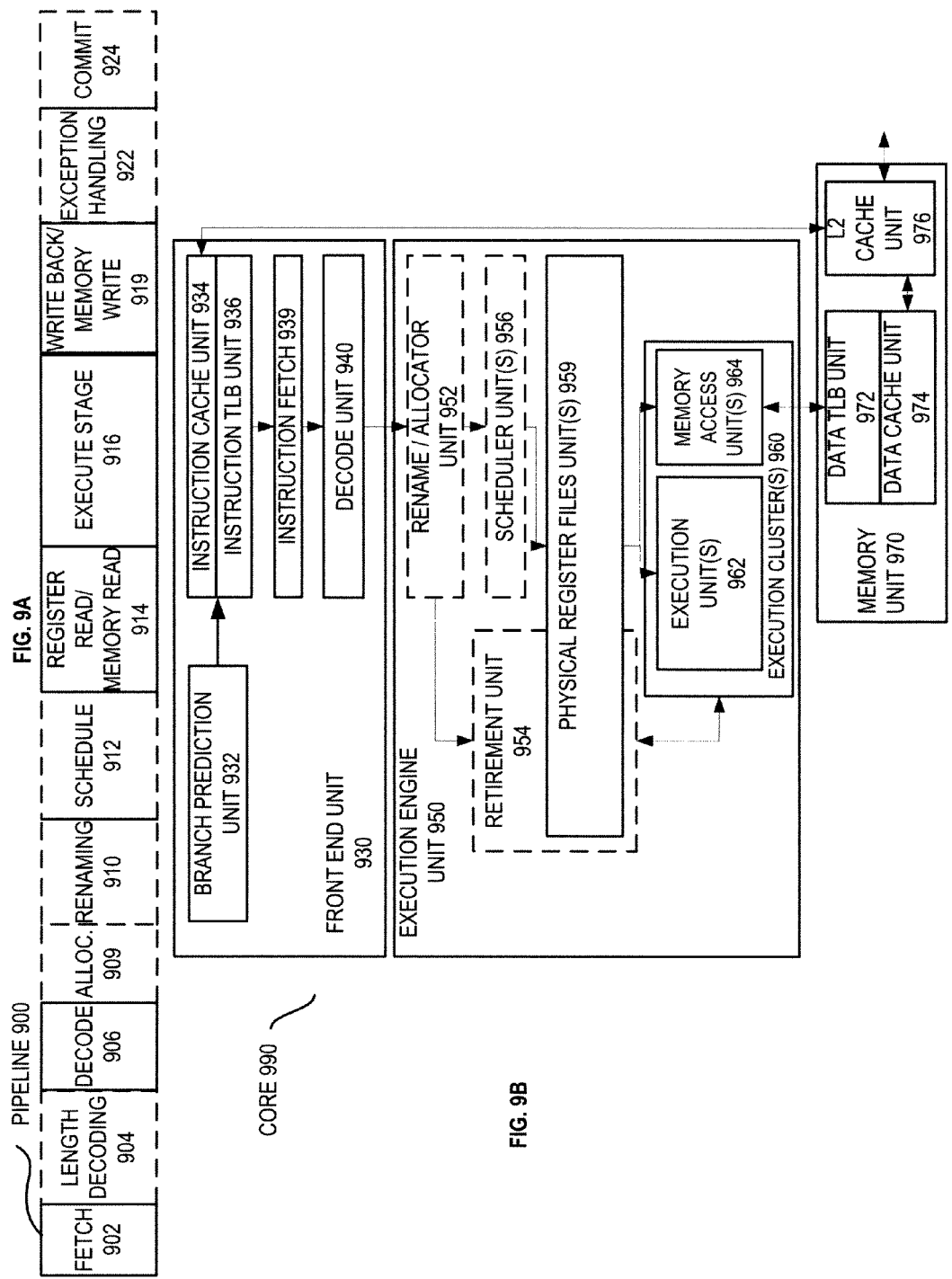

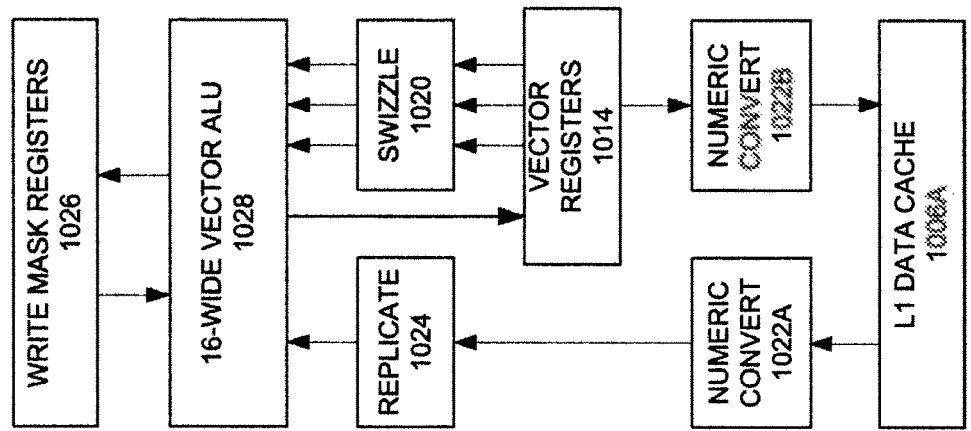
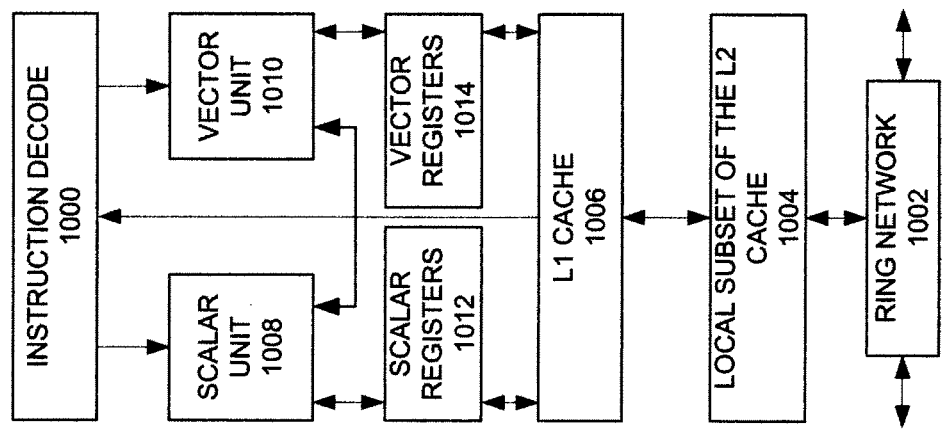

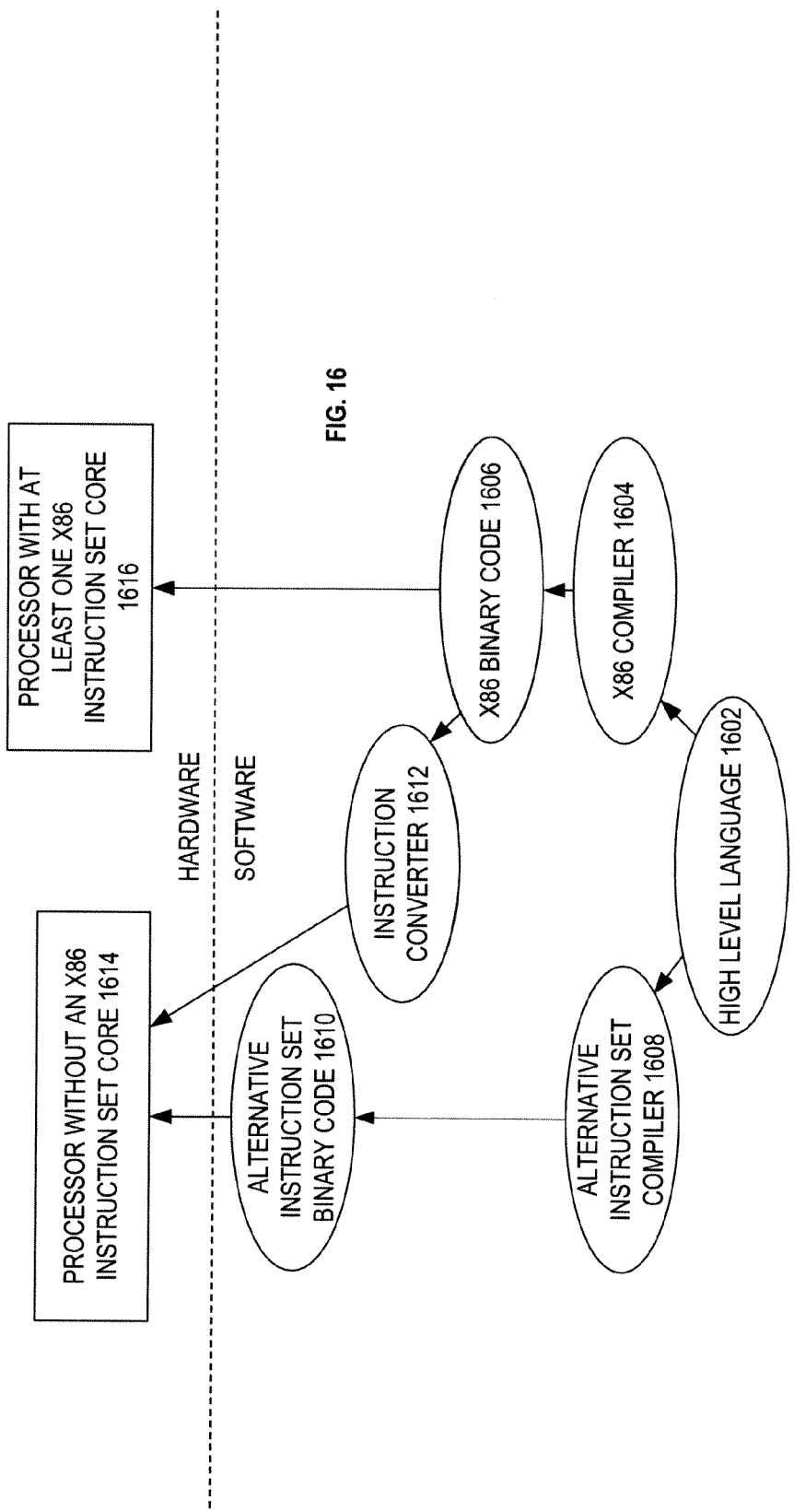

ately one simple illustrative example of a gadget

RETURN-TARGET RESTRICTIVE RETURN FROM PROCEDURE INSTRUCTIONS, PROCESSORS, METHODS, AND SYSTEMS

BACKGROUND

Technical Field

Embodiments described herein generally relate to processors. In particular, embodiments described herein generally relate to processors to perform return instructions.

Background Information

Return-oriented programming (ROP) is a computer security exploit technique that attackers can use to gain control over computer systems or other electronic devices. In ROP the attackers may gain control of the stack in order to hijack program control flow.

Control of the call stack is often achieved through a buffer overrun exploit or attack. In a buffer overrun, a function that does not sufficiently perform bounds checking before storing data into memory may accept more data than can be properly stored. For example, an attacker may send more data to a web browser than the web browser can properly store. If the data is being stored on the stack, some data may exceed the storage space allocated to that function's variables and overwrite the return address. The return address is an address that is stored on the stack by a call procedure instruction, which is intended to be used to redirect control flow back to the calling function after the called procedure has finished. However, in a buffer overrun attack or exploit, the return address may be overwritten with a different return address. This may allow the attacker to divert control flow to the different return address, execute code starting at the different return address, and perform potentially undesirable and/or malicious actions.

In an ROP attack, the attacker may chain together sequences of what are known as "gadgets." Each gadget may represent a set of one or a few instructions followed by a return from procedure instruction. The attacker may scan or examine various executable memory regions of code in order to locate or identify desired gadgets. Examples of such executable memory regions of code include, for example, applications, shared user-level libraries, drivers, system level code, and system-level libraries. As an example, the attacker may scan for the opcode 0xC3 corresponding to the return from procedure (RET) instruction as described in Intel® 64 and IA-32 Architectures Software Developer's Manual, Volume 2, Instruction Set Reference, A-Z, Order Number 325383-041US, December 2011. After identifying each opcode, the attacker may look to see if the preceding instruction(s) are useful as a gadget. By way of example, the attacker may identify a pop stack instruction followed by a return instruction as a first gadget, a register-to-register move instruction followed by a return instruction as a second gadget, and so on. In some cases, the attacker may be able to identify enough gadgets to form a so-called Turing-complete gadget catalog, which may allow the attacker to perform a wide variety or potentially almost any desired malicious actions.

FIG. 1 is a block diagram of an example three gadget chain 100. The chain includes a first gadget 101 that includes a pop eax instruction 102 and a first return from procedure (RET) instruction 103. The first gadget links to a second gadget 104. The second gadget includes a pop ecx instruction 105 and a second return from procedure instruction 106. The first and second gadgets pop data from the stack into the eax and ecx registers. The second gadget links to a third gadget 107. The third gadget includes a mov [ecx], eax instruction 108 and a third return from procedure instruction 109. The third gadget stores the value in register eax to the memory location indicated by the register ecx. The gadgets may be located in code 110 of potentially different types, such as applications, libraries, drivers, the operating system, etc. This is just one simple illustrative example of a gadget chain.

A rough but illustrative analogy is to consider the gadgets of ROP as somewhat analogous to individual letters cut out from different magazines or newspapers and used to spell a ransom note. Just as the individual letters are cut out of different magazines or newspapers and arranged in series to spell out the ransom note, individual gadgets (e.g., each including one or a few instructions followed by a return) are identified in potentially different pieces of code and linked together to create new code with different functionality. The Turing-complete functionality of gadgets may be somewhat analogous to having all the letters A through Z that are needed to spell out any desired message in that by an analogy they may be used to achieve almost any functionality.

Initially the buffer overrun attack may be used to hijack the return address on the stack and thereby hijack control flow. The address of the first instruction of the first gadget may be stored on the stack to divert the control flow to the first gadget. Instead of returning to the calling procedure (with the call procedure instruction), the control flow may transfer to the first instruction of the first gadget. Next, the return address of the first instruction of the second gadget in the chain may be stored on the stack. The return instruction of the first gadget may divert control flow to the second gadget. In this way, the return addresses of a series of gadgets may be sequentially stored on the stack and jumped to by the return instructions of the chained gadgets. By chaining the gadgets together in particular orders, the attacker may be able to create new program functionalities from pre-existing code. The attackers may potentially use this for undesirable or harmful purposes, such as, for example, stealing confidential information, interfering with or attacking other applications, sending emails, sending text messages, posting tweets, exploiting kernel vulnerabilities, etc.

BRIEF DESCRIPTION OF THE DRAWINGS

The invention may best be understood by referring to the following description and accompanying drawings that are used to illustrate embodiments. In the drawings:

FIG. 9A is a block diagram illustrating an embodiment of an in-order pipeline and an embodiment of a register renaming out-of-order issue/execution pipeline.

FIG. 9B is a block diagram of an embodiment of processor core including a front end unit coupled to an execution engine unit and both coupled to a memory unit.

FIG. 10A is a block diagram of an embodiment of a single processor core, along with its connection to the on-die interconnect network, and with its local subset of the Level 2 (L2) cache.

FIG. 10B is a block diagram of an embodiment of an expanded view of part of the processor core of FIG. 10A.

FIG. 16 is a block diagram of use of a software instruction converter to convert binary instructions in a source instruction set to binary instructions in a target instruction set, according to embodiments of the invention.

DETAILED DESCRIPTION OF EMBODIMENTS

Disclosed herein are return-target restrictive return from procedure instructions and return target instructions, processors to execute the instructions, methods performed by the processors when processing or executing the instructions, and systems incorporating one or more processors to process or execute the instructions. In the following description, numerous specific details are set forth (e.g., specific instruction operations, types of return-target restrictive information, processor configurations, microarchitectural details, sequences of operations, etc.). However, embodiments may be practiced without these specific details. In other instances, well-known circuits, structures and techniques have not been shown in detail to avoid obscuring the understanding of the description.

Figure 1:
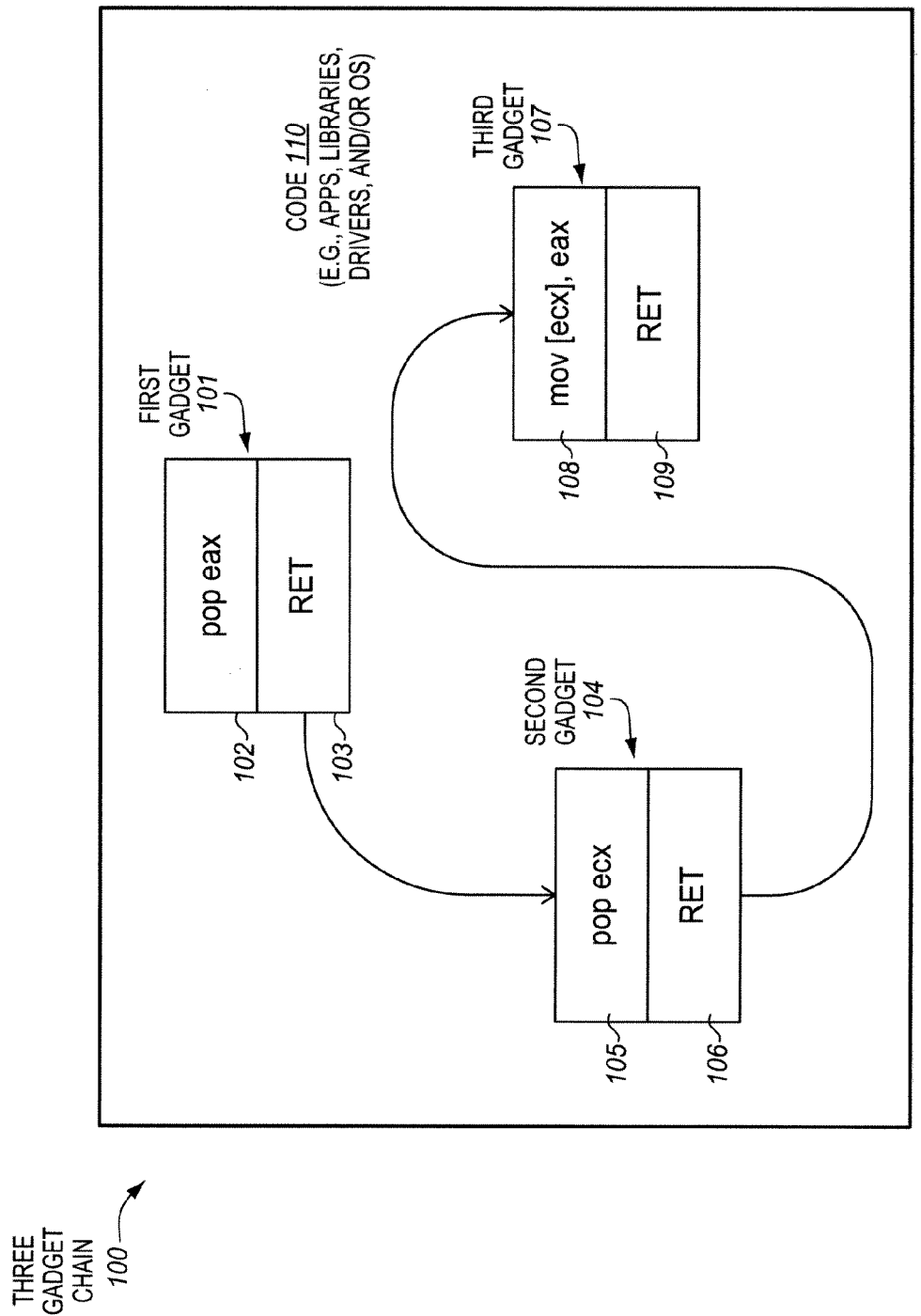
FIG. 1 is a block diagram of an example three gadget chain.
Figure 2:
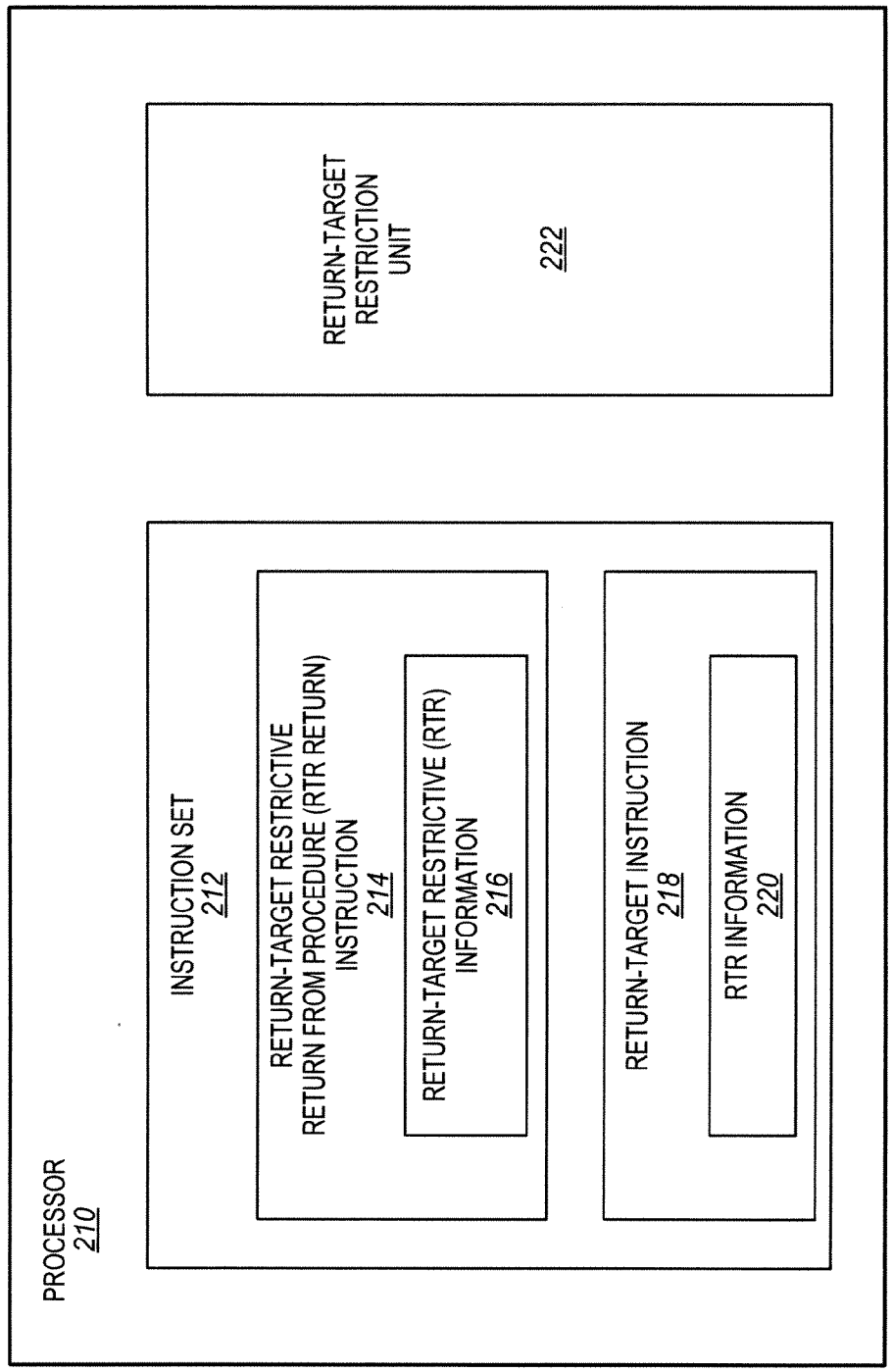
FIG. 2 is a block diagram of an embodiment of a processor.

FIG. 2 is a block diagram of an embodiment of a processor 210. The processor has an instruction set 212. The instruction set includes the native instructions of the processor. The instructions of the instruction set represent macroinstructions, assembly language instructions, or machine-level instructions provided to the processor for execution, as opposed to microinstructions, micro-ops, or instructions or control signals decoded from the instructions of the instruction set.

As shown, in some embodiments, the instruction set may include a return-target restrictive (RTR) return from procedure (return) instruction 214. In some embodiments, the RTR return instruction may have, may indicate, or may otherwise be associated with, return-target restrictive (RTR) information 216. As further shown, in some embodiments, the instruction set may include a return target instruction 218. In some embodiments, the return target instruction 218 may have, may indicate, or may otherwise be associated with, return-target restrictive (RTR) information 220. In some embodiments, the RTR return instruction and the return target instruction may represent a pair of instructions, intended to be used together, to conditionally restrict or limit attempted return control flow transfers (e.g., based on the RTR information).

The processor also includes a return target restriction unit 222. The return target restriction unit may be implemented in hardware, firmware, software, or a combination (e.g., hardware potentially combined with some firmware and/or software). In some embodiments, the RTR return instruction may be operable to cause the return target restriction unit and/or the processor to be restrictive or limiting with regard to which return targets (e.g., which instructions) the RTR return instruction is allowed to return control flow to. In some embodiments, the RTR return instruction may be operable to cause such restriction using and/or based on a type of instruction at the return target address. For example, in some embodiments, the attempted return control flow transfer to the instruction at the return target address may be allowed if the instruction at the return target address is of a same type (e.g., has a same opcode as) the return target instruction 218, or may otherwise be restricted or prevented. The return target instruction 218 may represent a type of instruction primarily designed or intended to serve as a marker for allowable or legitimate return targets for the RTR return instruction. In some embodiments, the RTR return instruction may be operable to cause such restriction using and/or based on the RTR information 216 of the RTR return instruction and the RTR information 220 of the return target instruction. For example, in some embodiments, the attempted return control flow transfer to the instruction at the return target may be allowed if the two sets of RTR information 216, 220 are equal, match, or are otherwise compatible. In one particular example embodiment, each set of RTR information may include a value (e.g., an integer value), and both values must be equal in order to be compatible. If the two sets of RTR information are not compatible, then the attempted return control flow transfer may be restricted or prevented. In some embodiments, the RTR information may be provided by immediates of the instructions, although the scope of the invention is not so limited.

Advantageously, the RTR return instruction 214 and the return target instruction 218 may help to conditionally restrict, limit, or provide more control over return control flow transfers. As one potential advantage, this may help to prevent return-oriented programming (ROP) attacks, or at least make launching them significantly harder. For one thing, ROP attacks generally need to rely on the ability to repeatedly perform return control flow transfers to the first instructions of the various chained gadgets (e.g., they need to be able to put the target addresses of the first instructions of these gadgets on the stack). However, in some embodiments, if an attempted return control flow transfer is to an instruction (e.g., a pop instruction, a mov instruction, etc.) of a different type (e.g., a different opcode) than a particular return target instruction 218, then the processor may restrict or prevent the return control flow transfer. This alone may tend to make it much harder for attackers to be able to discover useful gadgets that exist by happenstance, since, in addition to finding one or more useful instructions followed by a return instruction, the one or more useful instructions would also need to be preceded by the return target instruction 218. This alone may make it harder for attackers to be able to return to instructions not originally intended to return to. Moreover, in some embodiments, if an attempted return control flow transfer is to an instruction with mismatching or otherwise incompatible RTR information, then such a return control flow transfer may also be restricted or prevented. This may also make it harder for attackers to be able to return to instructions not originally intended to return to, since the return target instructions 218 would need to have matching or compatible RTR information.

Figure 3:
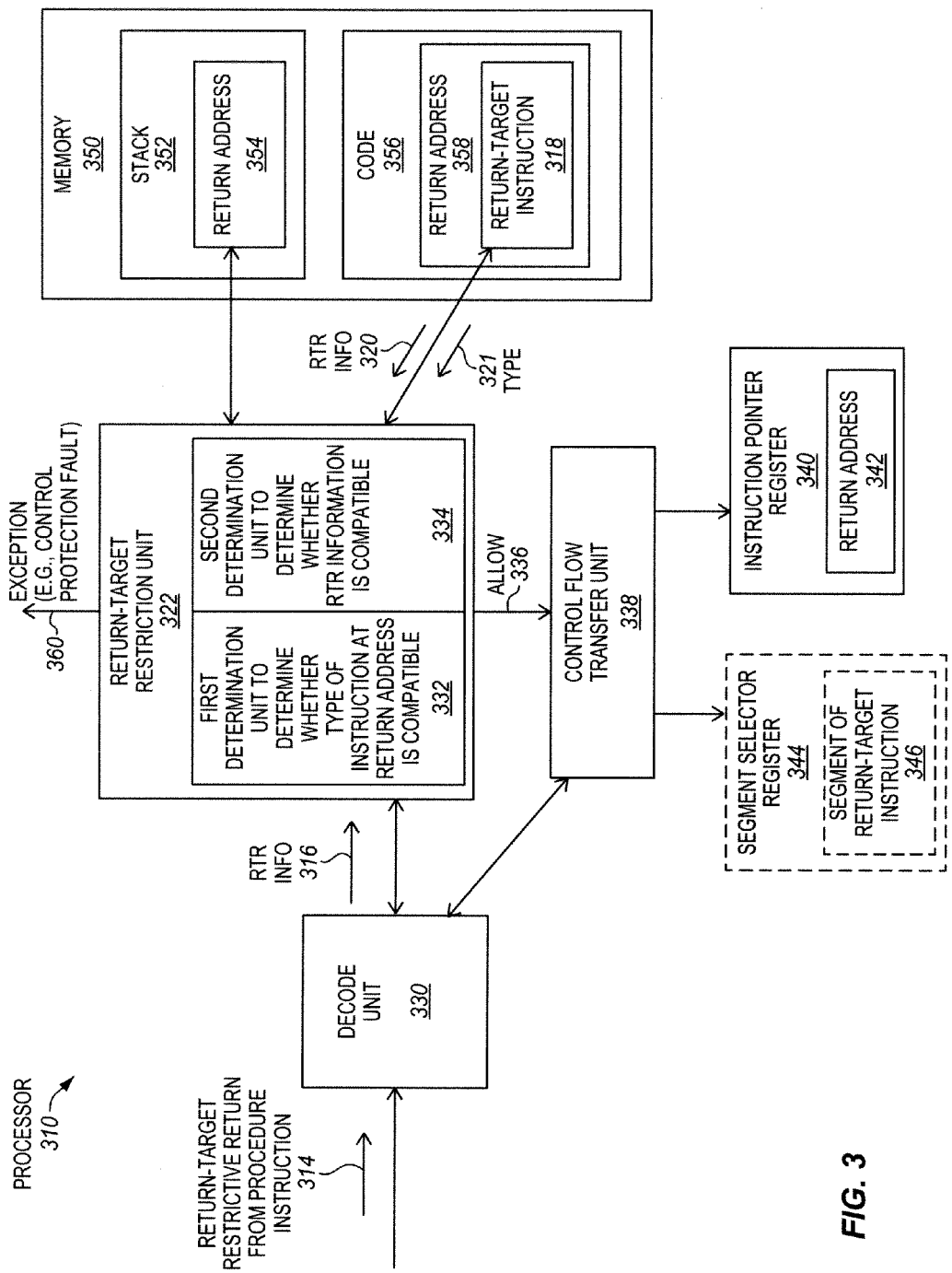
FIG. 3 is a block diagram of an embodiment of a processor that is operable to perform an embodiment of a return-target restrictive return from procedure instruction.

FIG. 3 is a block diagram of an embodiment of a processor 310 that is operable to perform an embodiment of a return-target restrictive (RTR) return from procedure (return) instruction 314. In some embodiments, the processor may be a general-purpose processor (e.g., a general-purpose microprocessor of the type used in desktop, laptop, or other computers). Alternatively, the processor may be a special-purpose processor. Examples of suitable special-purpose processors include, but are not limited to, network processors, communications processors, cryptographic processors, graphics processors, co-processors, embedded processors, digital signal processors (DSPs), and controllers (e.g., microcontrollers). The processor may be any of various complex instruction set computing (CISC) processors, reduced instruction set computing (RISC) processors, very long instruction word (VLIW) processors, hybrids thereof, other types of processors, or have a combination of such different processors (e.g., in different cores).

During operation, the processor may receive the embodiment of the RTR return instruction 314. By way of example, the RTR return instruction may be received from an instruction fetch unit, an instruction queue, or the like. The RTR return instruction may represent a macroinstruction, assembly language instruction, machine code instruction, or instruction or control signal of an instruction set of the processor. In some embodiments, the RTR return instruction may have, may indicate, or may otherwise be associated with return-target restrictive (RTR) information. In some embodiments, the RTR information may include one or more values associated with the RTR return instruction. In some embodiments, the RTR information may include a value in an immediate of the RTR return instruction. Other examples of possible ways for RTR information may be associated with the instruction include, but are not limited to, the RTR information being in a suffix of the instruction, in one or more bytes following the instruction, provided in a register indicated by the instruction, etc.

Referring again to FIG. 3, the processor includes a decode unit or decoder 330. The decode unit may receive and decode the relatively higher level RTR return instruction. The decode unit may output one or more microinstructions, micro-operations, micro-code entry points, decoded instructions or control signals, or other relatively lower-level instructions or control signals that reflect, represent, and/or are derived from the relatively higher-level RTR return instruction. The one or more lower-level instructions or control signals may implement the higher-level instruction through one or more lower-level (e.g., circuit-level or hardware-level) operations. In some embodiments, the decode unit may include one or more input structures (e.g., port(s), interconnect(s), an interface) to receive the instruction, an instruction recognition and decode logic coupled with the input structure to recognize and decode the instruction, and one or more output structures (e.g., port(s), interconnect(s), an interface) coupled with the instruction recognition and decode logic to output the one or more corresponding lower-level instructions or control signals. The decode unit may be implemented using various different mechanisms including, but not limited to, microcode read only memories (ROMs), look-up tables, hardware implementations, programmable logic arrays (PLAs), and other mechanisms used to implement decode units known in the art.

In some embodiments, instead of the RTR return instruction 314 being provided directly to the decode unit 330, an instruction emulator, translator, morpher, interpreter, or other instruction conversion module (not shown) may optionally be used. Various types of instruction conversion modules are known in the arts and may be implemented in software, hardware, firmware, or a combination thereof. In some embodiments, the instruction conversion module may be located outside the processor, such as, for example, on a separate die and/or in a memory (e.g., as a static, dynamic, or runtime emulation module). By way of example, the instruction conversion module may receive the RTR return instruction 314, which may be of a first instruction set, and may emulate, translate, morph, interpret, or otherwise convert the RTR return instruction into one or more corresponding or derived intermediate instructions or control signals, which may be of a second different instruction set. The one or more intermediate instructions or control signals of the second instruction set may be provided to a decode unit, which may decode them into one or more lower-level instructions or control signals that can be performed by native hardware or logic of the processor.

Referring again to FIG. 3, a memory 350 is coupled with the processor 310. Although the memory is shown in the illustrated embodiment, other embodiments pertain to the processor alone not coupled with such a memory (e.g., is not deployed in a system). During operation, the memory may store a stack 352. The stack may represent a stack type data structure operable to store data. A common purpose of the stack is to keep track of the return address or point to which each called procedure (e.g., each active subroutine) should return control when it finishes executing. As shown, the stack may store a return address 354 corresponding to the RTR return instruction 314. By way of example, a corresponding call procedure instruction, which called the procedure with the RTR return instruction, may store the return address 354 to the stack prior. The RTR return instruction may attempt to pop or otherwise retrieve the return address 354 from the stack and transfer control to the return address. The memory may also store code 356 having the associated return address 358 indicated by the return address 354 on the stack. The code has an instruction, in the illustrated example a return target instruction 318, located at the return address 358.

Referring again to FIG. 3, return target restriction unit 322 is coupled with the decode unit 330, and during use in a deployment is to be coupled with, or otherwise in communication with, the memory 350. The processor and/or the return target restriction unit is operable in response to and/or as a result of the RTR return instruction 314 (e.g., in response to one or more instructions or control signals decoded therefrom) to be restrictive or limiting with regard to which particular return targets (e.g., instructions) the RTR return instruction 314 is allowed to return control flow transfer to. In some embodiments, the return target restriction unit 322 may be operable responsive to the RTR return instruction 314 to determine whether or not to restrict control flow transfer to a return target instruction (e.g., in the illustrated example return target instruction 318) of the RTR return instruction 314 located at the return address 358 based on a type of the return target instruction and/or other non-opcode information of the return target instruction being compatible with the RTR return instruction.

In some embodiments, the return target restriction unit 322 may include a first determination unit 332 coupled with the decode unit, and (in use in a deployment) to be coupled with, or otherwise in communication with, the memory 350. The first determination unit may be responsive to the RTR return instruction 314, to determine whether an instruction at the return address 358 (e.g., return target instruction 318) is of a type that is compatible with the RTR return instruction 314. As shown, an indication of a type 321 of the instruction at the return address 358 (e.g., an opcode or an indication that the instruction is or is not a return target instruction 318) may be provided to the return target restriction unit 322. In some embodiments, only the return target instruction 318 may be of a type (e.g., have an opcode) that is compatible with the RTR return instruction 314, whereas other types of instructions (e.g., different opcodes of the instruction set) may not be compatible. Alternatively, a few different types of instructions (e.g., a few different opcodes), often not more than about five different types of instructions, may optionally be compatible with the RTR instruction, whereas a generally larger number of different types (e.g., a larger number of different remaining opcodes of the instruction set) may not be compatible.

In some embodiments, such compatible type(s) of instructions 318 may represent dedicated return target marker type(s) of instructions that are intended or designed solely or primarily to be used in combination with the RTR return instruction 314 to mark potentially legitimate or allowable return target positions for RTR return instruction. Generally, the return target instruction 318 may not have arithmetic, logical, memory access, or other functions, although it is contemplated that they could if desired for the particular implementation. In some embodiments, the return target instruction 318 may be of a type that, aside from checking their type and providing their RTR information, may be executed or performed as a no operation (NOP). In some embodiments, the existence of such a compatible instruction may be a necessary condition, but not a sufficient condition, to allow a return to a location. If such a compatible instruction is not located at the return address 358, then the return target restriction unit 322 and/or the processor may restrict or not allow the attempted return to the return address 358. For example, the return target restriction unit and/or the processor may issue or signal an exception 360, such as, for example, a control protection fault.

In some embodiments, the return target restriction unit 322 may include a second determination unit 334 coupled with the decode unit, and (in use in a deployment) to be coupled with, or otherwise in communication with, the memory 350. The second determination unit may be responsive to the RTR return instruction 314, to determine whether RTR information of, indicated by, or otherwise associated with, the instruction at the return address 358 (e.g., the return target instruction 318) is compatible with RTR information of, indicated by, or otherwise associated with, the RTR return instruction 314. As shown, the RTR information 320 of the instruction at the return address 358 may be provided to the return target restriction unit 322, and the RTR information 316 of the RTR return instruction may be provided to the return target restriction unit 322.

The two sets of RTR information may be compatible in different ways in different embodiments. For example, in some embodiments, the two sets of RTR information may be compatible if and only if they are equal or otherwise match. For example, each set of RTR information may potentially include a value, and the two values may be compatible or matching if and only if they are equal. Alternatively, the two sets of RTR information may be matching or compatible in other ways desired for the particular implementation. For example, the two sets of RTR information may match and/or be compatible with one another through a function (e.g., a hash function, a checksum function, a logical AND, OR, NOT, XOR, or other logical operation or function, etc.). In some embodiments, if the two sets of RTR information are not compatible, then the return target restriction unit 322 and/or the processor may restrict or not allow the attempted return to the return address 358. For example, the return target restriction unit 322 and/or the processor may issue or signal an exception 360, such as, for example, a control protection fault.

In other embodiments, it is possible to combine RTR information from the instructions with other information, although this is not required. Examples of such other information include, but are not limited to, processor identification type information (e.g., from a processor identification register), device specific information (e.g., a model number or serial number), platform specific information, operating system privileged information, part (e.g., a first byte) or all of a cryptographic key, or the like. For example, an immediate from the instruction may be appended to, hashed with, XOR'd with, or otherwise combined with such information. This may help to enhance security, since hackers would typically not readily know such information. If one side of the compare (e.g., the return) combined the immediate with such additional information and the other side (e.g., the return target) only used the immediate, then software would be customized for the specific device (e.g., device specific information). The customer may obtain software from a trusted source that knows such information. Software for one device may not be able to run on another device.

If the type of the instruction at the return address is compatible, and if the two sets of RTR information are compatible, then the return target restriction unit and/or the processor may determine not to restrict and/or to allow the control flow transfer to the attempted return target at the return address 358. For example, the return target restriction unit 322 may provide an allow signal 336 to control flow transfer unit 338. Except for the control flow transfer being contingent on the determination or authorization by the return target restriction unit (e.g., the allow signal 336), the control flow transfer unit may be substantially conventional. For example, the control flow transfer unit may include a jump execution unit, or other type of unit or logic suitable to implement a return from procedure control transfer operation. Representatively, the control flow transfer unit may store the return address 358 as a return address 342 in an instruction pointer register 340. In embodiments in which segmented memory is optionally used, which is not required, if the instruction at the return address is located in a different segment (e.g., in the case of an inter-segment control transfer), the control flow transfer unit may store a segment 346 for the return target instruction 318 in a segment selector register 344.

To further illustrate certain concepts, consider a detailed example embodiment of a pair of RTR return and return target instructions. One particular embodiment of an RTR return instruction is a RETK instruction having a constant K (e.g., an integer) provided in an immediate of the instruction (e.g. a 2-bit, 4-bit, 8-bit, or 16-bit immediate). Generally, the greater the number of possible values of the constant, the greater the protection against malicious attacks. By way of example, an 8-bit immediate may be able to provide values ranging from 0 to 255. One particular embodiment of a return target instruction is an ENDRETK instruction having a constant K in an immediate. The ENDRETK instruction marks an end return point or potentially permissible return target for the RETK instruction. Often, it may be convenient to make the immediates of the two instructions have the same size, although this is not required as long as the values can be equal. In order for a control flow transfer to be allowed by the return target restriction unit 322 and/or the processor, both the presence of the ENDRETK instruction at the attempted return target address and also equality of the two constants K in the two instructions may need to be found. For example, a RET17 instruction may only be allowed to return to an ENDRET17 instruction, but not an ENDRET16 instruction or any other non-ENDRET17 instruction. Likewise, a RET232 instruction may only be allowed to return to an ENDRET232 instruction, but not an ENDRET17 instruction or any other non-ENDRET232 instruction. If the RET232 instruction attempts to return to a pop stack instruction, an add instruction, an ENDRET231 instruction, or any other instruction besides an ENDRET232 instruction, then the attempted return may be restricted or prevented, and an exception (e.g., a control protection fault) may be raised. It is to be appreciated that this is just one illustrative example, and that the scope of the invention is not limited to this particular example.

The return target restriction unit 322 and/or the processor may include specific or particular logic (e.g., transistors, integrated circuitry, or other hardware potentially combined with firmware (e.g., instructions stored in non-volatile memory) and/or software (e.g., higher-level instructions stored in memory)) that is operable to perform the RTR return instruction and/or determine whether or not to restrict return to the return target in response to and/or as a result of the RTR return instruction.

Advantageously, the RTR return instruction and the return target instruction may help to conditionally restrict, limit, or provide more control over return control flow transfers. As one potential advantage, this may help to prevent return-oriented programming (ROP) attacks, or at least make them significantly harder to launch. For one thing, ROP attacks generally need to rely on the ability to repeatedly perform return control flow transfers to the first instructions of the various chained gadgets. However, in some embodiments, if an attempted return control flow transfer is to an instruction of a different type (e.g., a different opcode) than a particular return target instruction 318, then such a return control flow transfer may be restricted or prevented. Moreover, in some embodiments, if an attempted return control flow transfer is to an instruction with mismatching or otherwise incompatible RTR information, then such a return control flow transfer may be restricted or prevented. Overall, this may tend to make it harder for an attacker to attempt to return to locations not originally intended to be returned to. The use of the specific return target instruction, and the sets of compatible RTR information, may help to fix the allowable return paths in code so that arbitrarily returning to the attackers desired return targets is generally very unlikely. When the program is created, the locations of the return target instructions and the compatible pairs of RTR information indicate all the intended return targets. Different return targets generally cannot be found easily, since often the return target instructions would not be present at the desired locations and/or would not have compatible RTR information. This may tend to make the number of gadgets that exist by happenstance very rare.

Figure 4:
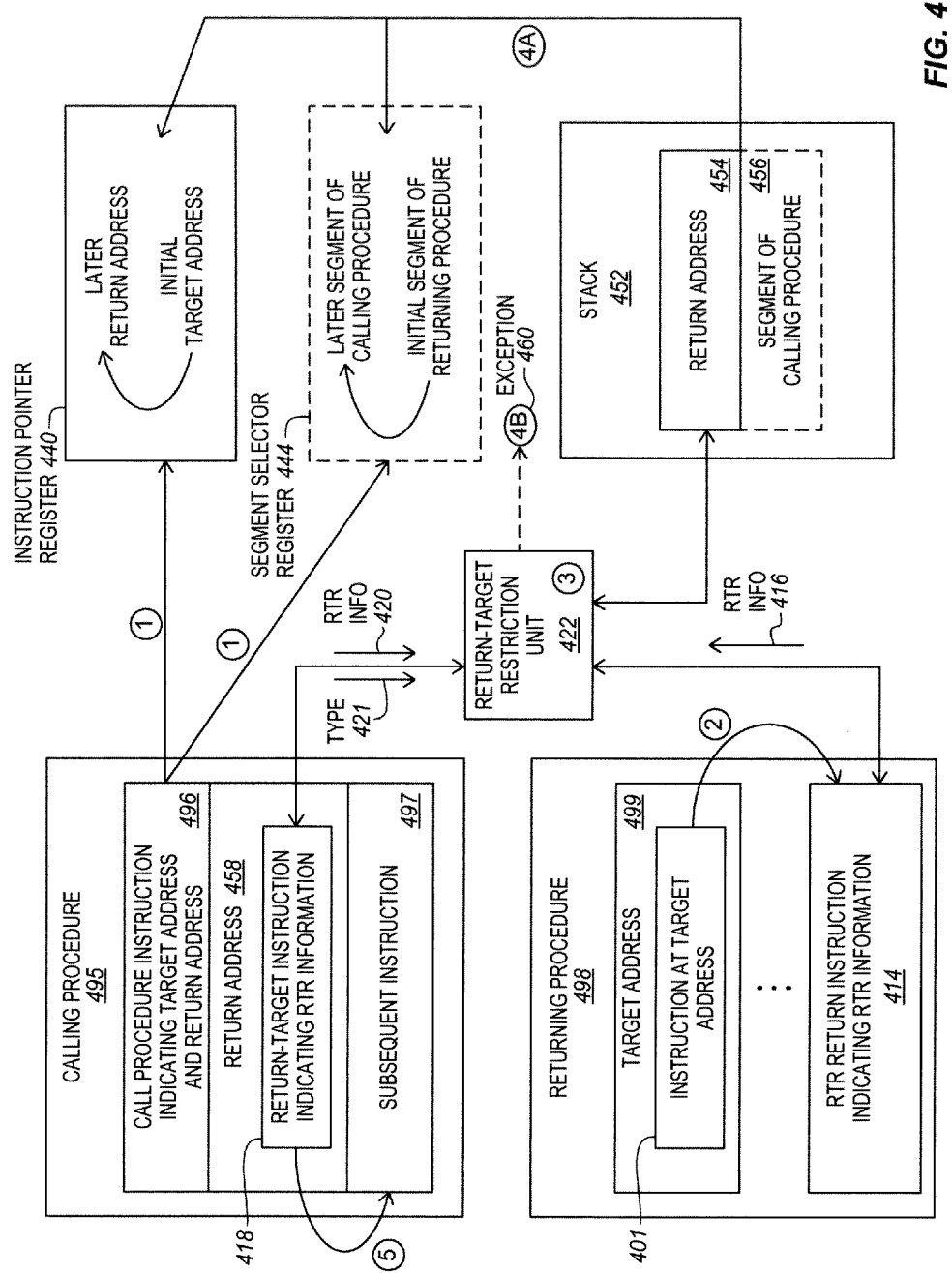
FIG. 4 is a block diagram illustrating an embodiment of operation of a return-target restrictive return from procedure instruction and return target instruction.

FIG. 4 is a block diagram illustrating use of an embodiment of an RTR return instruction 414 and an embodiment of a return target instruction 418 by an embodiment of a return target restriction unit 422. A calling procedure 495 has a call procedure instruction 496 indicating a target address 499 and a return address 458. The target address 499 is for a first instruction 401 in a returning procedure 498. As shown at (1), the call procedure instruction causes the processor to store the initial target address on an instruction pointer register 440, and to store an initial segment of the returning procedure 498 in a segment selector register. A return address 454 may also be stored on the stack 452 corresponding to return address 458. Control flow then jumps or transfers to the returning procedure 498. As shown at (2), the instruction 401 at the target address 498 may be executed and then one or more other instructions leading to the RTR return instruction 414 may be executed. When the RTR return instruction 414 is executed, return target restriction unit 422 may receive RTR information 416 of the RTR return instruction and RTR information 420 of the implicated return target instruction 418 at the return address 454 on the stack 452 indicated by the RTR return instruction. An indication of a type 421 of the return target instruction may also be provided to the return target restriction unit 422. As (3), the return target restriction unit may determine whether to allow or restrict the attempted control flow transfer to the return target instruction 418 as described elsewhere herein. If the determination is not to restrict, then as shown at (4A) it may store the return address 454 to the instruction pointer register 440 and may store the segment of the calling procedure 446 to the segment selector register 444 (in the case of an inter-segment transfer). If the determination is to restrict, then as shown at (4B) it may raise an exception 460. A jump or transfer to the return target instruction 418 may then be made. As shown at (5), the return target instruction may potentially execute as a NOP and then execution may continue with a subsequent instruction 497.

Figure 5:
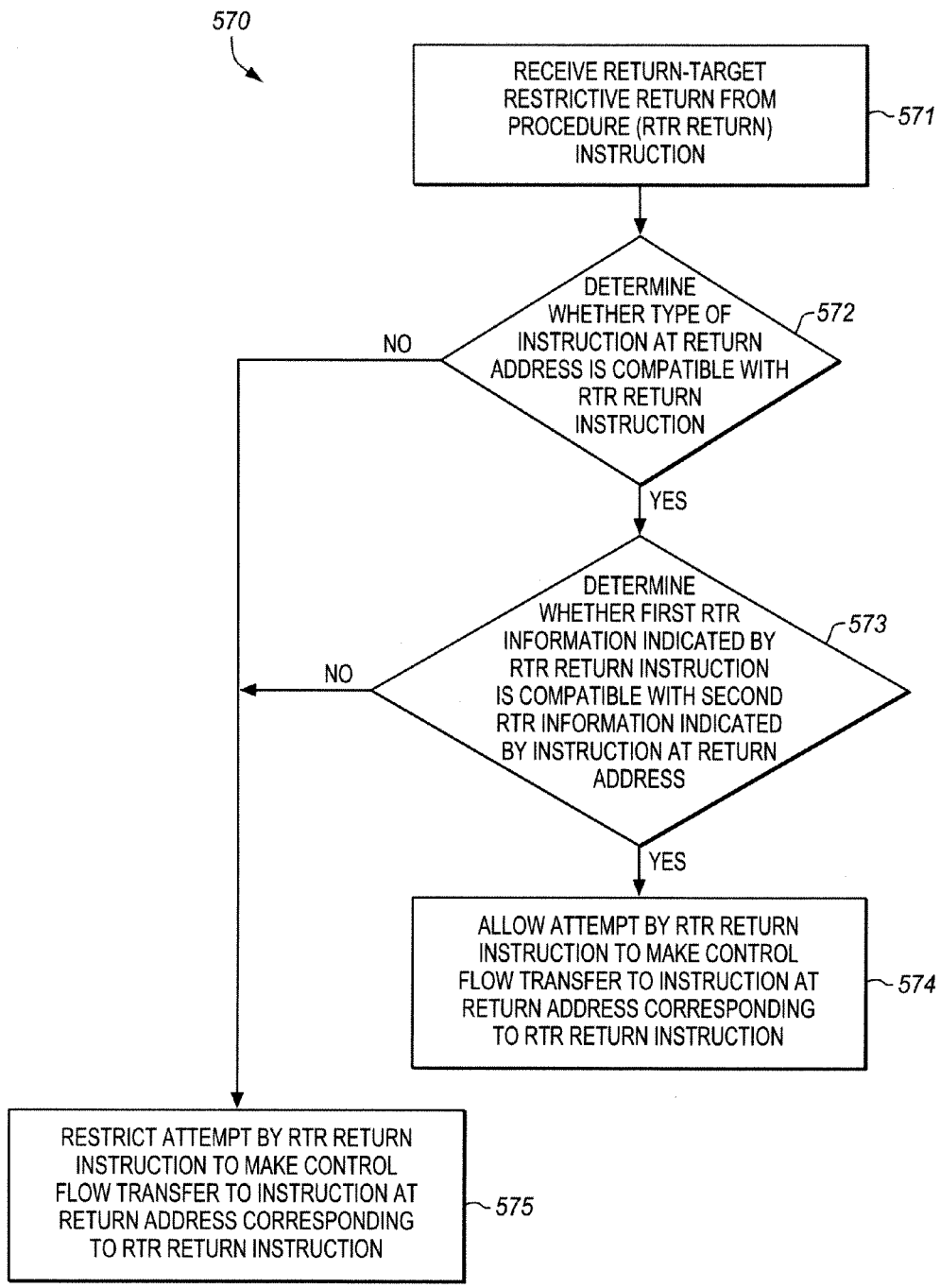
FIG. 5 is a block flow diagram of an embodiment of a method of performing an embodiment of a return target restrictive return from procedure instruction.

FIG. 5 is a block flow diagram of an embodiment of a method 570 of performing an embodiment of a return target restrictive return from procedure (RTR return) instruction. In various embodiments, the method may be performed by a processor, instruction processing apparatus, or other digital logic device. In some embodiments, the operations and/or method of FIG. 5 may be performed by and/or within the processor of either of FIGS. 2-3. The components, features, and specific optional details described herein for the processor either of FIGS. 2-3, also optionally apply to the operations and/or method of FIG. 5. Alternatively, the operations and/or method of FIG. 5 may be performed by and/or within a similar or different processor or apparatus. Moreover, the processor of either of FIGS. 2-3 may perform operations and/or methods the same as, similar to, or different than those of FIG. 5.

The method includes receiving the RTR return instruction, at block 571. In various aspects, the instruction may be received at a processor, an instruction processing apparatus, or a portion thereof (e.g., an instruction fetch unit, a decode unit, a bus interface unit, etc.). In various aspects, the instruction may be received from an off-die source (e.g., from memory, interconnect, etc.), or from an on-die source (e.g., from an instruction cache, instruction queue, etc.). In some embodiments, the return target restrictive return from procedure instruction may have, may indicate, or may otherwise correspond to or be associated with, RTR information.

A determination may be made whether a type of the instruction at the return address is compatible with the RTR return instruction, at block 572x. If the type is determined to be compatible (i.e., "yes" is the determination at block 572), the method may advance to block 573. In some embodiments, in order for the type to be found compatible the instruction at the return address should be a return target instruction as described elsewhere herein.

At block 573, a determination may be made whether a first RTR information indicated by the RTR return instruction is compatible with a second RTR information indicated by the instruction at the return address. This determination may be made as described elsewhere herein. If the sets of RTR information are determined to be compatible (i.e., "yes" is the determination at block 573), the method may advance to block 574.

At block 574, the method may allow an attempt by the RTR return instruction to make a control flow transfer to an instruction at the return address corresponding to the RTR return instruction. Conversely, if either the type is determined not to be compatible (i.e., "no" is the determination at block 572), or if the sets of RTR information are determined not to be compatible (i.e., "no" is the determination at block 573), then the method may advance to block 575. At block 575, the method may restrict the attempt by the RTR return instruction to make the control flow transfer to the instruction at the return address corresponding to the RTR return instruction.

Another potential advantage of the RTR return instructions and/or RTR information disclosed herein is that they may help to facilitate and/or improve the analysis or examination of code for risks of attack (e.g., ROP attacks). Code is often reviewed, vetted, and verified through analysis before it is allowed to be used. For example, this often occurs for digital distribution platforms. As one example, the App Store is a digital distribution platform for mobile apps on iOS that allows users to browse and download applications that were developed with Apple's iOS software development kit (SDK). Another example is the Mac App Store which has applications for download that are designed for Mac computers. Application publishers may submit applications to such digital distribution platforms for consideration for being sold or downloaded from the digital distribution platforms or stores. Commonly, as part of the process, the applications may be reviewed, vetted, and verified before they are allowed to be purchased or downloaded.

A common type of analysis performed during such reviews is static analysis (e.g., static binary evaluation techniques). However, one drawback to these techniques is that they are often not perfectly suited for detecting ROP type of attacks. Further background discussion on this topic is available in the article "Jekyll on iOS: When Benign Apps Become Evil", 22nd USENIX Security Symposium, August 2013. One concern is that attackers may write malicious applications designed to carry out attacks, while potentially evading detection during static analysis. For example, the attacker may create seemingly normal code (e.g., an application), which has hidden gadgets that are difficult to detect by static analysis. As one particular example, an application developer may write a seemingly normal video game to be distributed through the App Store, but with hidden gadgets for an ROP attack included in the application. The attacker may submit the video game or other application to the App Store or other digital distribution platform for vetting and verification. Static analysis may be performed including tracing through call and return paths according to the intended flow of the application. However, the static analysis may not be able to contemplate or anticipate the different malicious return paths that are only to be followed during runtime according to the attackers runtime commands. Recall that in an ROP attack, the return paths are determined at runtime by controlling the control flow transfers dynamically by placing return addresses on the stack. As a result, the hidden gadgets may be able to evade detection during the static analysis. The application may pass the application review and vetting process, and may be placed on the App store for purchase and/or download. When the video game or other application is installed on the smartphone, pad computer, or other computer system, the attacker may initiate the attack. The attacker may introduce malicious control flows and assemble the gadgets in a particular order to perform malicious operations.

Advantageously, the RTR return instructions and/or RTR information disclosed herein may help to facilitate and/or improve analysis of code for malicious intent and/or hidden gadgets. For one thing, the pairs of RTR return and return target instructions and/or the pairs of compatible RTR information may make more static or fixed the possible control flow return paths. During runtime, the control flow return paths may be restricted from going anywhere the attacker chooses, but rather may be limited to the control flow return paths consistent or compatible with these pairs of instructions and pairs of compatible RTR information. The locations of the return target instructions and the sets of compatible RTR information indicate all the possible/permitted return targets. It may be possible to jump to several different possible return locations also having a compatible return target instruction with compatible RTR information (e.g., by happenstance, etc.), although it should be easier to anticipate or foresee these different return paths, and they should generally be less in number. This may make it much easier for analysis (e.g., static analysis techniques) to trace through the possible return paths, which may help to aid detection of malicious code. This may also help to make it much harder for application developer to craft an application that can perform a ROP attack or other malicious attack, while being able to evade detection during analysis.

Figure 6:
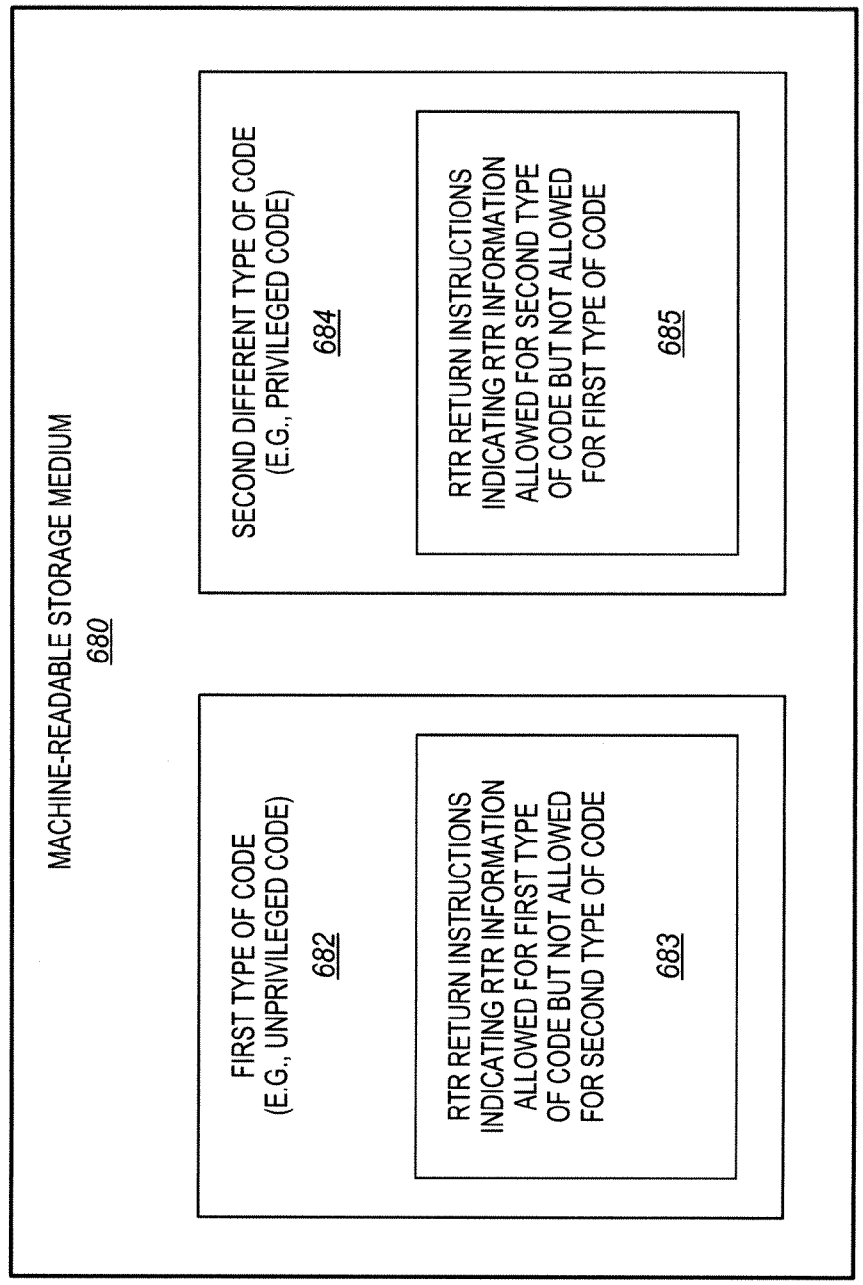
FIG. 6 is a block diagram of an embodiment of a machine-readable storage medium storing a first type of code and a second different type of code, respectively, having RTR return instructions that indicate different permissible or allowable RTR information.

FIG. 6 is a block diagram of an embodiment of a machine-readable medium 680 (e.g., a machine-readable storage medium) storing or otherwise providing a first type of code 682 and a second different type of code 684, respectively, having RTR return instructions 683, 685 that indicate different permissible or allowable RTR information. In some embodiments, the first type of code may be user-level code and/or unprivileged-level code, whereas the second type of code may be system-level code and/or privileged-level code. In other embodiments, other different types of code may be used, such as, for example, library code versus non-library code, device driver code versus non-driver code, operating system code versus non-operating system code, user-level code versus non-user-level code, or various combinations thereof.

The first type of code has RTR return instructions 683 indicating RTR information that is allowed or permitted for the first type of code 682, but which is not allowed for the second different type of code 684. In some embodiments, the RTR information that is allowed for the first type of code (e.g., user-level code) may not be allowed for a plurality of other types of code (e.g., operating system code, device driver code, etc.). Similarly, the second different type of code has RTR return instructions 685 indicating RTR information that is allowed or permitted for the second type of code 684, but which is not allowed for the first type of code 682. In some embodiments, the RTR information that is allowed for the second type of code (e.g., operating system code) may not be allowed for a plurality of other types of code (e.g., user-level code, device driver code, etc.).

In some embodiments, different allowable RTR information may be used for different levels of privilege or security. For example, the RTR information of the RTR return instructions 683 of the first type of code 682 (e.g., user-level and/or unprivileged-level code) may be limited to a set of permissible or allowable values that are mutually exclusive with respect to a set of permissible or allowable values for the RTR information of the RTR return instructions 685 of the second type of code 684 (e.g., system-level and/or privileged-level code). For example, non-overlapping ranges of values may be used for these two different types of code. As one particular illustrative example, integer values 0-127 may optionally be used for the RTR information for the first type of code 682, whereas integer values 128-255 may optionally be used for the RTR information for the second type of code 684.

In addition, more than two (e.g., three, four, five, or more) different types of code may optionally have different mutually exclusive sets (e.g., integer ranges) of allowable RTR information, if desired. For example, in one particular example embodiment, a six different mutually exclusive sets (e.g., integer ranges) of allowable RTR information for RTR instructions may optionally be used. For example, a first range of integer values may be used for the RTR instructions of user applications, a second different range of values may be used for the RTR instructions of user libraries, a third still different range of values may be used for the RTR instructions of system applications, a fourth still different range of values may be used for the RTR instructions of system libraries, a fifth still different range of values may be used for the RTR instructions of device drivers, and a sixth still different range of values may be used for the RTR instructions of operating system kernel. It is to be appreciated that this is just one illustrative example which is not required.

Notice in this embodiment that the allowable RTR information is assigned to and/or regulated for the RTR return instructions, not the return target instructions. As an example, a user-level application may not be allowed to contain an RTR return instruction with RTR information (e.g., a value) not allowed for the user-level application (e.g., instead reserved for the operating system). The user-level code may, however, be allowed to have a return target instruction (e.g., an ENDRETK instruction) with RTR information (e.g., a value) equal, matching, or complimentary to the RTR information reserved for the operating system. In this way, the user-level application may call an operating system procedure which has a RTR return instruction with the RTR information reserved for the operating system and a return may be allowed back to the user-level application having a return target instruction with complementary RTR information.

Figure 7:
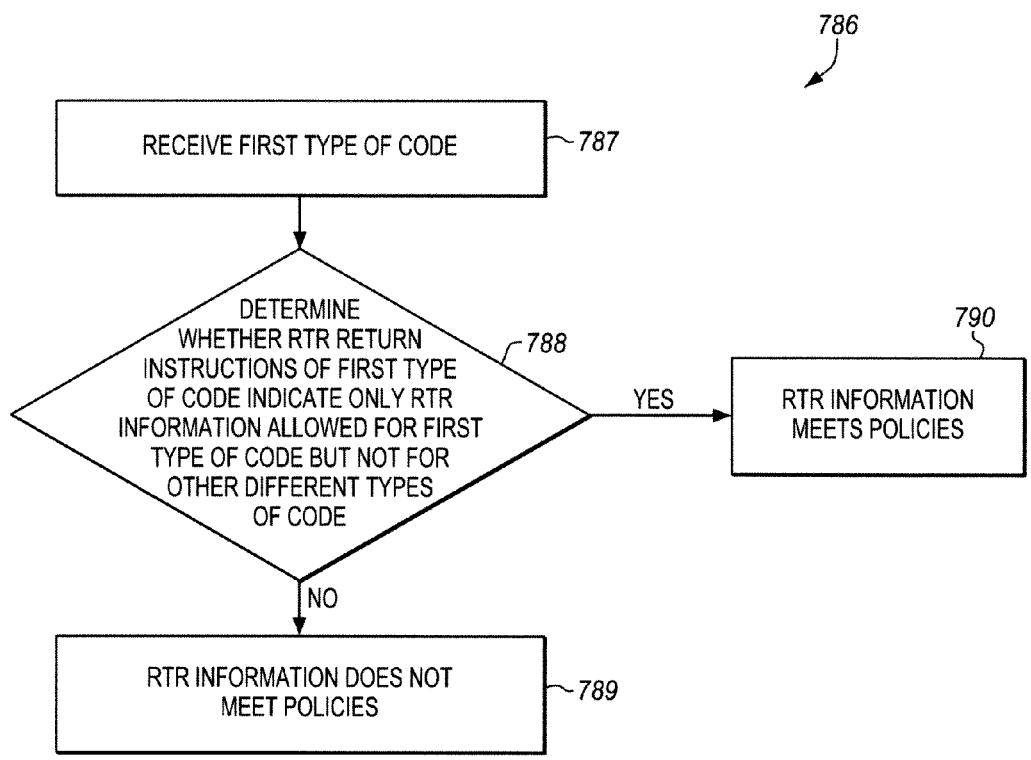
FIG. 7 is a block flow diagram of a first embodiment of a method of analyzing code.

FIG. 7 is a block flow diagram of an embodiment of a method 786 of analyzing code. The code analysis may be used to determine whether or not code meets policies or rules regulating what RTR information for RTR return instructions is permissible or allowable. In some embodiments, the method may be performed by a code analysis system. For example, in some embodiments, the code analysis system may be modules an application store (e.g., the App Store) or other digital distribution platform which does the analysis to verify that an application developer has assigned RTR information according to rules or policies). As another example, the code analysis system may include one or more operating system, virtual machine modules, or other privileged level software modules. In yet another example, logic of a processor, such as microcode and/or hardware, may perform the method.

The method includes receiving a first type of code, at block 787. For example, a code reception module may receive the code. The method includes determining whether RTR return instructions of the first type of code indicate only RTR information allowed for the first type of code, but not for one or more other types of code, at block 788. The types of code may be any of those mentioned previously. This may include using any of the aforementioned mutually exclusive sets or ranges of RTR information previously mentioned. If the determination is "no", the method advances to block 789, where the RTR information is determined not to meet the policies or rules. Otherwise, if the determination is "yes", the method advances to block 790, where the RTR information is determined to meet the policies or rules. As one example, a digital distribution platform module may decide not to verify the code in response to block 789, unless the RTR information is amended to meet the rules or policies. As another example, an operating system module may determine not to allow the code to run in response to block 789.

Figure 8:
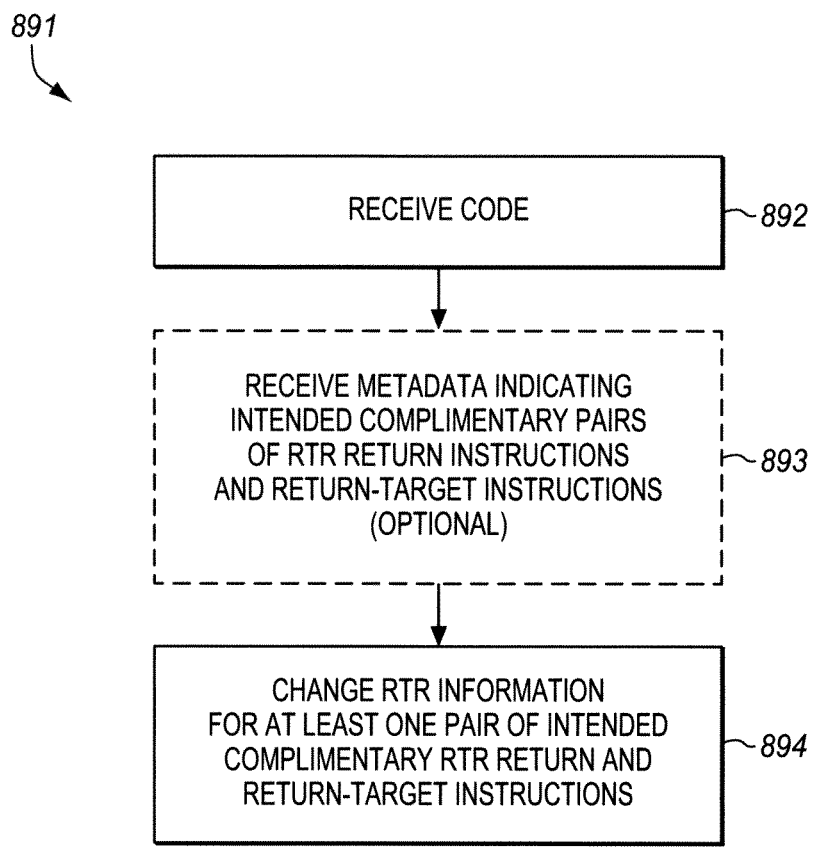
FIG. 8 is a block flow diagram of a second embodiment of a method of analyzing code.

FIG. 8 is a block flow diagram of another embodiment of a method 891 of analyzing code. In some embodiments, the method may be performed by a code analysis system. For example, in some embodiments, the code analysis system may be modules of application store (e.g., the App Store) or other digital distribution platform. As another example, the code analysis system may include one or more privileged level software modules.

The method includes receiving code, at block 892. For example, a code reception module may receive the code. The method optionally includes receiving metadata indicating intended complimentary pairs of RTR return and return target instructions, at block 893. In some embodiments, a code analysis system may require that intended complimentary pairs of RTR return and return target instructions that are to have matching or compatible RTR information be identified. For example, a code analysis system of an application store (e.g., the App Store) or other digital distribution platform may require such identification when the applications or code are submitted for consideration and review and/or before being approved. The application developer may need to submit metadata indicating these intended complimentary pairs of RTR return and return target instructions along with the application or code. As another example, one or more privileged level software modules may require such metadata or identification at time of application invocation. Such information may also be used to improve analysis for potential attacks.

The method includes changing RTR information for at least one pair of intended complimentary RTR return and return target instructions, while allowing the RTR information to remain complimentary, at block 894. In some embodiments, the code analysis system or a module may use the indications or metadata to assign new or different RTR information (e.g., values) to at least one, selectively to some, to a majority of, or to all of the intended pairs of compatible RTR return and return target instructions. For example, the RTR information of an RTR return instruction and its identified return target instruction may be changed so that they remain compatible but have different RTR information than before. As an example, a RET17/ENDRET17 pair may be changed to a RET233/ENDRET233 pair.

This may be done in different ways in different embodiments. In one aspect, the system or a module may check that there is a sufficient level of diversity or entropy among all the sets of RTR information (e.g., a ratio of different to same pairs of RTR information at least meeting a threshold). As an extreme example, if code used the same RTR information for all RTR return and return target instruction pairs, then the value of the checking for the RTR information compatibility may be reduced. If the system or module detects that there are too many intended pairs of compatible instructions with the same RTR information (e.g., above a threshold), it may determine to change some of the RTR information to reduce the number of different possible return target control transfers that the processor would allow. The metadata may be used for this purpose. This may help to remove some hidden gadgets. This may be done by a system or module of a digital distribution platform, an operating system module, or the like.

In another aspect, the RTR information of some, a majority, or all intended pairs of compatible instructions may optionally be changed (e.g., pseudo-randomly, according to a replacement algorithm, etc.) whether or not there is checking for diversity. This may help to mix up or shuffle the RTR information for the different pairs, which may help to prevent hidden gadgets crafted to have the same compatible RTR information. For example, in one particular embodiment, a privileged-level software module (e.g., an operating system module, virtual machine monitor module, etc.) may assign new or different RTR information to some, a majority, or all indicated or intended pairs of instructions at the time an application or code is invoked or loaded. In another particular embodiment, a module (e.g., of a digital distribution platform or operating system) may assign new or different RTR information to some, a majority, or all indicated or intended pairs of instructions at the time of the code download (e.g., when an app is being downloaded).

Still other ways of placing additional constraints on the RTR information are also contemplated. For example, in some embodiments, a module (e.g., of a digital distribution platform or a privileged software module) may impose policies or rules regulating that different or unique sets of RTR information are to be used for each of the different RTR return instructions in order to be permissible or allowable. For example, each RTR return instruction may be mandated to have a different value (e.g., a different integer or constant). The amount of RTR information (e.g., the number of bits) may be sufficient to provide all these different values. The particular amount of RTR information depends on the particular implementation.

In some embodiments, the RTR return instructions and return target instructions disclosed herein may be given new different opcodes that are not defined and/or are illegal in legacy code. In other words, these opcodes may not exist in an instruction set of a processor that predates the introduction of the RTR return and return target instructions into the instruction set.

In other embodiments, the RTR return instructions and/or return target instructions disclosed herein may be given opcodes that are the same as those of legacy instruction(s) and/or were defined for the legacy instruction set. This may allow these instructions to run on legacy hardware. In one embodiment, a return target instruction (e.g., a RETK instruction) may be encoded so the RTR information (e.g., the K) is an immediate or suffix to an existing return from procedure instruction (e.g., a RET instruction). For example, in Intel Architecture, a near return from procedure instruction is the single byte instruction C3. The RTR information (e.g., the K) may be appended to the end of the C3 instruction so that the instruction would be able to run on legacy hardware, since the old hardware would interpret the C3 as the legacy return from procedure instruction, and ignore the subsequent RTR information (e.g., the K). The legacy hardware may view the RTR information (e.g., the K) as a suffix that may be ignored or at least doesn't need to be used. In contrast, on new hardware, the RTR information (e.g., the K) may be viewed by the processor as an immediate providing RTR information to be used to condition the control flow transfers. Turning now to the return target instruction, in one embodiment, the return target instruction (e.g., the ENDRETK instruction) may be encoded as a legal or defined instance of a no operation (NOP) in the legacy instruction set. In this way, legacy hardware may be able to process the return target instruction (e.g., the ENDRETK instruction), since it is merely treated as a NOP. In contrast, on new hardware, the return target instruction (e.g., the ENDRETK instruction) may be used to provide RTR information as described elsewhere herein.

In other embodiments, an opcode of a legacy instruction may optionally be repurposed. For example, this may be done for a legacy instruction that is not commonly used in modern environments and/or is in the process of being deprecated. As one example, a RETn instruction in Intel Architecture (e.g., having the C2 or CA opcodes) may optionally be repurposed. The RETn instruction has a 16-bit immediate (imm16) that is used to specify the number of bytes (e.g., imm16 bytes) to pop from the stack. Currently, the RETn instruction is not widely used, and is on the way to being deprecated, largely because it is currently more common to have data in registers instead of pushing it to, and then popping it from, the stack. A processor may have a first or legacy mode, in which the RETn instruction may be interpreted or implemented conventionally where the 16-bit immediate is used to indicate the number of bytes to pop from the stack. The processor may also have a second or new mode, in which the RETn instruction may be interpreted or implemented with the 16-bit immediate providing RTR information (e.g., a K value).

In some embodiments, with some help from system software, new calling procedures having the novel return target instructions disclosed herein may be able to call into a legacy procedure (e.g., a procedure of a legacy shared function library) and still be able to take advantage of the return target restrictions disclosed herein. For example, there may be a legacy return from procedure instruction (e.g., a legacy RET instruction with the C3 opcode) in the legacy procedure, and a plurality of bits or one or more bytes after the legacy return from procedure instruction may be used or interpreted as RTR information (e.g., a K value). Typically, there will be a plurality of bits or one or more bytes present after a legacy return instruction (e.g., a C3 RET instruction). For example, memory may be allocated in chunks (e.g., of 4 KB). The return instruction may be somewhere within these chunks. Typically, there would be some byte after the return instruction, unless the return instruction happened to be the very last byte of the chunk and also the next chunk was not allocated. For example, if the application allocates 4 KB at address 0x50000, and another 4 KB at address 0x51000, and the return instruction is at address 50FFF, then the next byte is at 0x5100, and this next byte may be used as RTR information. Conversely, if the return instruction is at 0x51FFF, and a chunk of memory at 0x52000 were not allocated, then there would not be an extra byte for RTR information. That is, in some embodiments, a plurality of bits or one or more bytes following a legacy return from procedure instruction in a legacy procedure (e.g., a library) may be used as RTR information. The new calling procedure may have the novel return target instruction with complementary RTR information.

System software (invoked on a control protection fault) may handle certain cases. For example, the system software may also handle a situation where the legacy return instruction appears at the end of the code space and the bytes that would be present in the virtual address space after the RET are not mapped to physical memory. The system software may also handle a case in which the library has internal returns, and being a legacy library is missing internal return target instructions, such as, for example, by consulting a whitelist or using other logic. In some embodiments, system software (e.g., an operating system) may have policies that recognize that old procedures are being called and may allow certain of the restrictive controls disclosed herein to be ignored.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 9A is a block diagram illustrating both an exemplary in-order pipeline and an exemplary register renaming, out-of-order issue/execution pipeline according to embodiments of the invention. FIG. 9B is a block diagram illustrating both an exemplary embodiment of an in-order architecture core and an exemplary register renaming, out-of-order issue/execution architecture core to be included in a processor according to embodiments of the invention. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/ vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 10B is an expanded view of part of the processor core in FIG. 10A according to embodiments of the invention. FIG. 10B includes an L1 data cache 1006A part of the L1 cache 1004, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Processor with Integrated Memory Controller and Graphics

Figure 11:
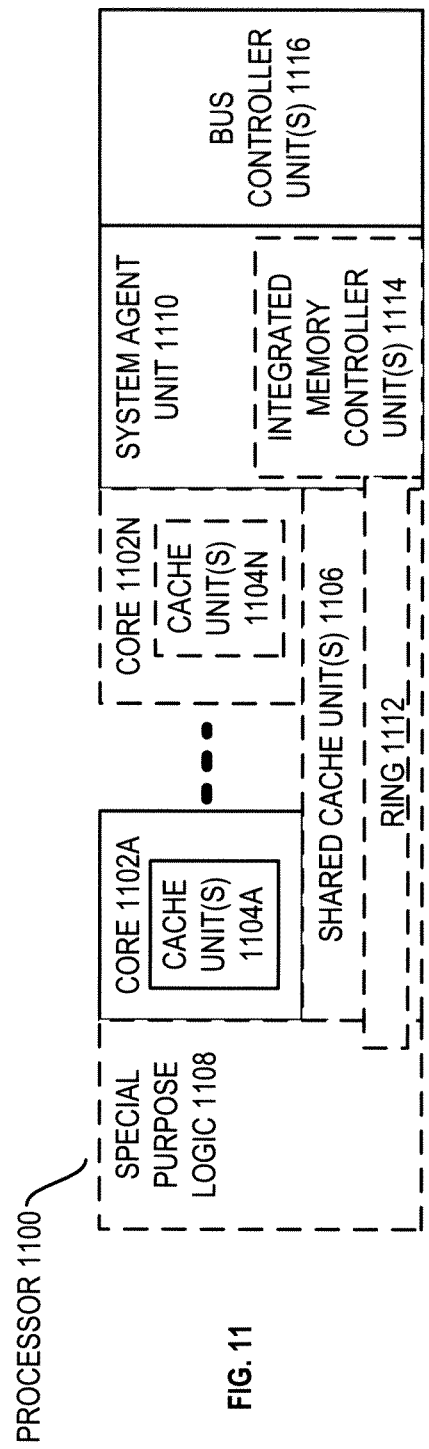
FIG. 11 is a block diagram of an embodiment of a processor that may have more than one core, may have an integrated memory controller, and may have integrated graphics.

FIG. 11 is a block diagram of a processor 1100 that may have more than one core, may have an integrated memory controller, and may have integrated graphics according to embodiments of the invention. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multi-threading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 12-15 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
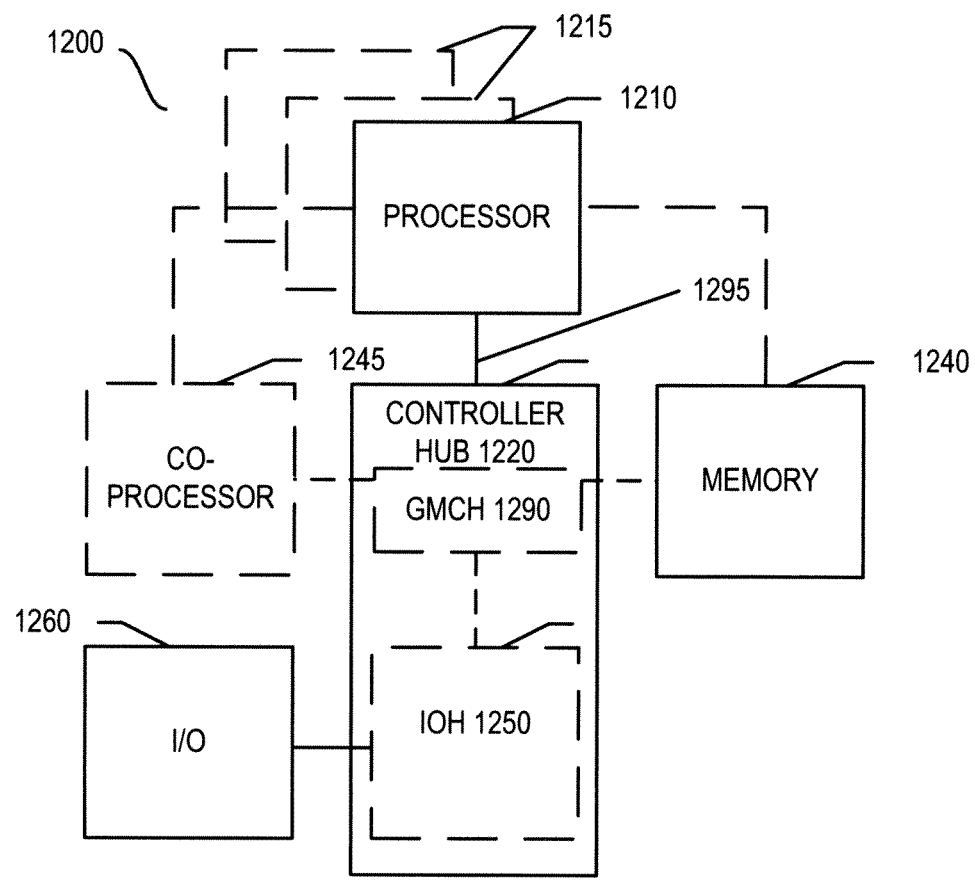
FIG. 12 is a block diagram of a first embodiment of a computer architecture.

Referring now to FIG. 12, shown is a block diagram of a system 1200 in accordance with one embodiment of the present invention. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 is couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
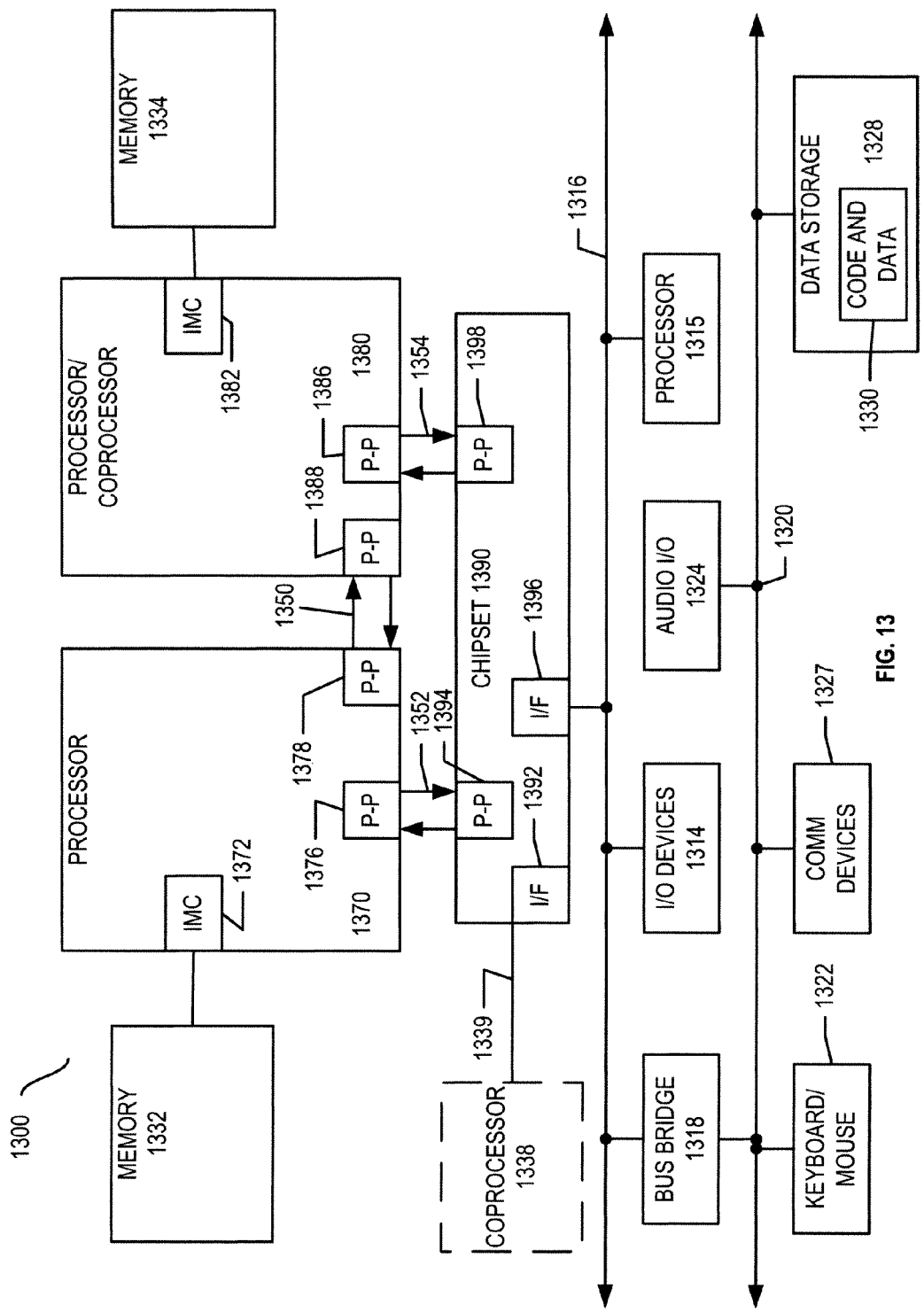
FIG. 13 is a block diagram of a second embodiment of a computer architecture.

Referring now to FIG. 13, shown is a block diagram of a first more specific exemplary system 1300 in accordance with an embodiment of the present invention. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Figure 14:
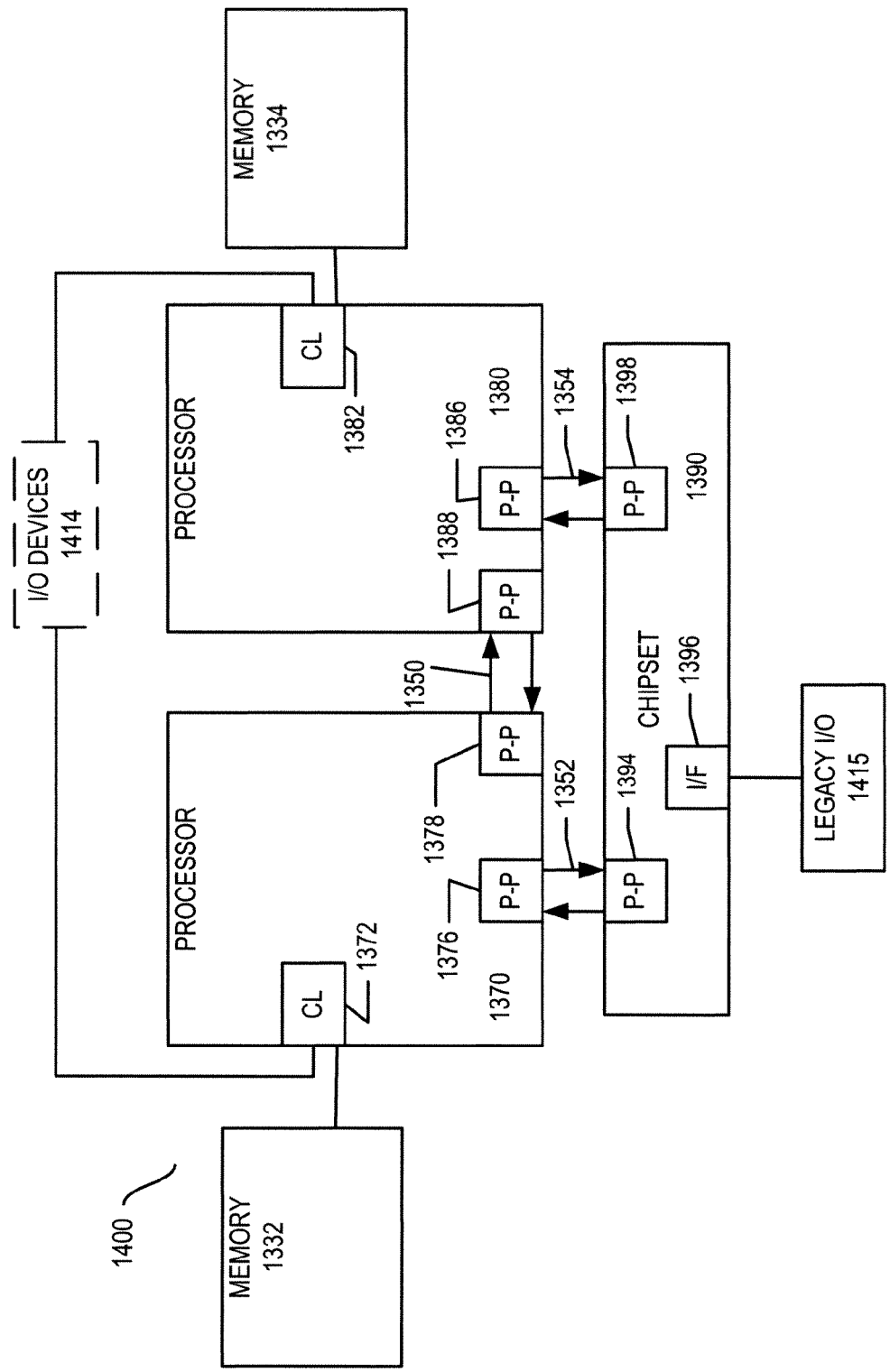
FIG. 14 is a block diagram of a third embodiment of a computer architecture.

Referring now to FIG. 14, shown is a block diagram of a second more specific exemplary system 1400 in accordance with an embodiment of the present invention. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1372 and 1382, respectively. Thus, the CL 1372, 1382 include integrated memory controller units and include I/O control logic. FIG. 14 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 15:
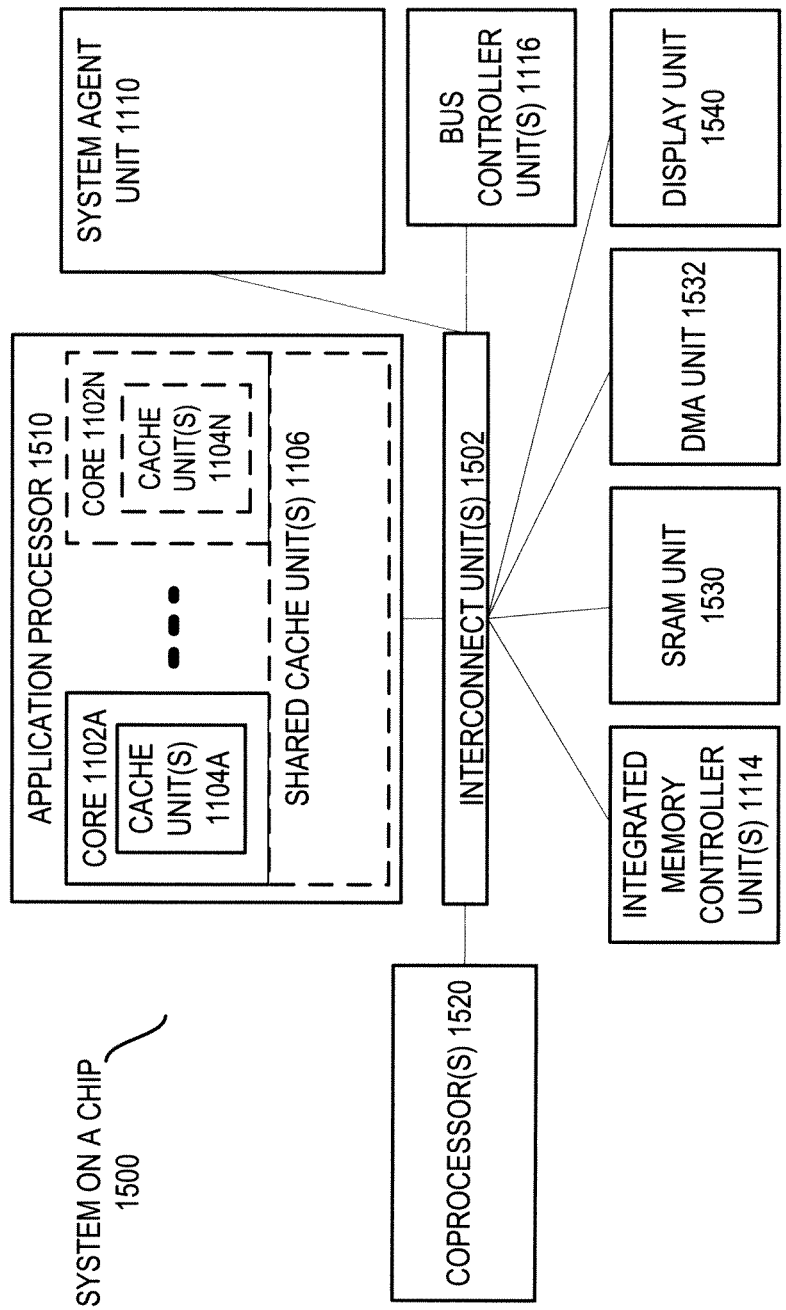
FIG. 15 is a block diagram of an embodiment of a system-on-a-chip architecture.

Referring now to FIG. 15, shown is a block diagram of a SoC 1500 in accordance with an embodiment of the present invention. Similar elements in FIG. 11 bear like reference numerals. Also, dashed lined boxes are optional features on more advanced SoCs. In FIG. 15, an interconnect unit(s) 1502 is coupled to: an application processor 1510 which includes a set of one or more cores 202A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 16 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

Components, features, and details described for any of the apparatus described herein may also optionally be used in and/or apply to any of the methods described herein performed by and/or with such apparatus. Any of the processors described herein may be included in any of the computer systems or other systems disclosed herein. In some embodiments, the instructions may have features or details of the instruction formats disclosed herein, although this is not required.

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, a return target restriction unit may be coupled with a decode unit through one or more intervening components. In the figures, arrows are used to show connections and couplings.

The term "and/or" may have been used. As used herein, the term "and/or" means one or the other or both (e.g., A and/or B means A or B or both A and B).

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise.

Various operations and methods have been described. Some of the methods have been described in a relatively basic form in the flow diagrams, but operations may optionally be added to and/or removed from the methods. In addition, while the flow diagrams show a particular order of operations according to embodiments, that order is exemplary. Alternate embodiments may perform the operations in different order, combine certain operations, overlap certain operations, etc.

Certain operations may be performed by hardware components, or may be embodied in machine-executable or circuit-executable instructions, that may be used to cause and/or result in a machine, circuit, or hardware component (e.g., a processor, potion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operable to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operable to cause the machine to perform and/or result in the machine performing one or operations, methods, or techniques disclosed herein. The machine-readable medium may store or otherwise provide one or more of the embodiments of the instructions disclosed herein.

In some embodiments, the machine-readable medium may include a tangible and/or non-transitory machine-readable storage medium. For example, the tangible and/or non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal.

Examples of suitable machines include, but are not limited to, a general-purpose processor, a special-purpose processor, an instruction processing apparatus, a digital logic circuit, an integrated circuit, or the like. Still other examples of suitable machines include a computing device or other electronic device that includes a processor, instruction processing apparatus, digital logic circuit, or integrated circuit. Examples of such computing devices and electronic devices include, but are not limited to, desktop computers, laptop computers, notebook computers, tablet computers, netbooks, smartphones, cellular phones, servers, network devices (e.g., routers and switches.), Mobile Internet devices (MIDs), media players, smart televisions, nettops, set-top boxes, and video game controllers.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

EXAMPLE EMBODIMENTS

The following examples pertain to further embodiments. Specifics in the examples may be used anywhere in one or more embodiments.

Example 1 is a processor including a decode unit to decode a return target restrictive return from procedure (RTR return) instruction. The processor also includes a return target restriction unit coupled with the decode unit, and responsive to the RTR return instruction, to determine whether to restrict an attempt by the RTR return instruction to make a control flow transfer to an instruction at a return address corresponding to the RTR return instruction. The determination is based on compatibility of a type of the instruction at the return address with the RTR return instruction, and based on compatibility of first return target restrictive information (RTR information) of the RTR return instruction with second RTR information of the instruction at the return address. The processor also includes a control flow transfer unit coupled with the return target restriction unit and with the decode unit, the control flow transfer unit responsive to the RTR return instruction, to transfer control flow to the instruction at the return address when the return target restriction unit determines not to restrict the attempt.

Example 2 includes the processor of Example 1, in which the return target restriction unit is to determine not to restrict the attempt when a first value corresponding to the first RTR information matches a second value corresponding to the second RTR information, and is to determine to restrict the attempt when the first value does not match the second value.

Example 3 includes the processor of Example 2, in which the return target restriction unit is to determine not to restrict the attempt when the first value equals the second value, and is to determine to restrict the attempt when the first value does not equal the second value.

Example 4 includes the processor of Example 1, in which the return target restriction unit is to determine to restrict the attempt when an opcode of the instruction at the return address is not one of a set of no more than five opcodes that correspond to all instructions that are of a type compatible with the RTR return instruction. The instructions are are to be used to mark potentially allowable return targets for the RTR return instruction.

Example 5 includes the processor of Example 1, in which the RTR return instruction has an immediate to provide the first RTR information, and in which the instruction at the return address has an immediate to provide the second RTR information.

Example 6 includes the processor of any one of Examples 1 to 5, in which, when the return target restriction unit determines not to restrict the attempt, the processor is to perform the instruction at the return address as a no operation.

Example 7 includes the processor of any one of Examples 1 to 5, in which, when the return target restriction unit determines to restrict the attempt, the return target restriction unit is to cause one of an exception, a fault, and an interrupt.

Example 8 includes the processor of Example 1, in which the decode unit is to decode the RTR return instruction which is to have an immediate and an opcode that is same as a legacy return from procedure instruction that existed in an instruction set before the RTR return instruction. The legacy return from procedure instruction was originally to cause a number of bytes indicated by the immediate to be popped from a stack. The processor is to use the immediate for the first RTR information.

Example 9 includes the processor of Example 1, in which the decode unit is to decode the RTR return instruction which is to have an immediate and an opcode that is same as a legacy return from procedure instruction that existed in an instruction set before the RTR return instruction. The processor optionally has a first mode in which the immediate is to correspond to the first RTR information and a second mode in which the immediate is to be ignored.

Example 10 is a method in a processor including receiving a return target restrictive return from procedure (RTR return) instruction. Restricting, responsive to the RTR return instruction, an attempt by the RTR return instruction to make a control flow transfer to an instruction at a return address corresponding to the RTR return instruction. The restriction is based on at least one of determining that a type of the instruction at the return address is not compatible with the RTR return instruction, and determining that first return target restrictive information (RTR information) indicated by the RTR return instruction is not compatible with second RTR information indicated by the instruction at the return address.

Example 11 includes the method of Example 10, in which the restricting is based on a determination that the RTR information of the RTR return instruction is not equal to RTR information of the instruction at the return address.

Example 12 includes the method of Example 10, in which the restricting is based on a determination that an opcode of the instruction at the return address is not one of a set of no more than five opcodes that correspond to all instructions that are of a type compatible with the RTR return instruction.

Example 13 includes the method of Example 10, in which receiving includes receiving the RTR return instruction having an immediate to provide the first RTR information.

Example 14 is a code analysis system including a code reception module to receive code of a first type. A code analysis module is coupled with the code reception module to determine whether all return target restrictive return from procedure (RTR return) instructions in the code of the first type indicate only return target restrictive information (RTR information) allowed for the first type, but not one or more different types of code.

Example 15 includes the code analysis system of Example 14, in which the first type includes unprivileged code and the one or more different types of code comprise privileged code.

Example 16 includes the code analysis system of Example 14, in which the first type includes a user-level application and the one or more different types of code comprise a plurality of user-level library code, device driver code, system-level library code, and operating system code.

Example 17 includes the code analysis system of Example 14, in which the code analysis module is to determine whether all RTR return instructions in the code of the first type indicate only values RTR information that are in a first range, and in which the first range is to be mutually exclusive with one or more other ranges corresponding to the one or more different types of code.

Example 18 includes the code analysis system of any one of Examples 14 to 17, in which the code analysis module includes a module of a digital distribution platform and an operating system module.

Example 19 includes the code analysis system of any one of Examples 14 to 17, in which the code analysis module includes an operating system module.

Example 20 is a code analysis system including a code reception module to receive code. The system also includes a code analysis module coupled with the code reception module to change return target restrictive information (RTR information) for at least one pair of complimentary return target restrictive return from procedure (RTR return) and return target instructions. This is done while making the RTR information of the pair of complimentary RTR return and return target instructions remain complimentary.

Example 21 includes the code analysis system of Example 20, in which the code reception module is further to receive metadata indicating a plurality of pair of complimentary RTR return and return target instructions in the code. The code analysis module is to change RTR information for each pair of complimentary RTR return and return target instructions while making the RTR information for each pair of complimentary RTR return and return target instructions remain complimentary.

Example 22 includes the code analysis system of any of Examples 20 to 21, in which the code analysis module includes an operating system module.

Example 23 includes the code analysis system of any of Examples 20 to 21, in which the code analysis module includes a module of a digital distribution platform.

Example 24 is a system to process instructions including an interconnect, and a processor coupled with the interconnect. The processor is to receive a return target restrictive return from procedure (RTR return) instruction. The processor, in response to the RTR return instruction, is to determine to restrict an attempt by the RTR return instruction to make a control flow transfer to an instruction at a return address corresponding to the RTR return instruction, based on one of a lack of compatibility of a type of the instruction at the return address with the RTR return instruction and a lack of compatibility of first return target restrictive information (RTR information) of the RTR return instruction with the instruction at the return address. The system also includes a dynamic random access memory (DRAM) coupled with the interconnect.

Example 25 includes the system of Example 24, in which the processor is to determine to restrict the attempt based on a value of an immediate of the RTR return instruction not being equal to a value of an immediate of the instruction at the return address. The processor in response to determining to restrict the attempt may cause one of a fault and an exception.

Example 26 is an article of manufacture including a non-transitory machine-readable storage medium. The non-transitory machine-readable storage medium stores instructions. The instructions, if executed by a machine are to cause the machine to perform operations including examining return target restrictive information (RTR information) of all return target restrictive return from procedure (RTR return) instructions in code of a first type. Also, determining whether the RTR return instructions in the code of the first type indicate only RTR information allowed for the first type of code but not allowed for one or more different types of code.

Example 27 includes the article of manufacture of Example 26, in which the instructions are to cause the machine to determine whether the RTR instructions in the code of the first type indicate only values in a first range allowed for the first type of code but not allowed for the one or more different types of code.

Example 28 is a processor or other apparatus that is operable to perform the method of any of Examples 10-13.

Example 29 is a processor or other apparatus including means for performing the method of any of Examples 10-13.

Example 30 is a processor or other apparatus including modules, units, logic, circuitry, means, or any combination thereof, to perform the method of any of Examples 10-13.

Example 31 is an article of manufacture including a machine-readable medium, which is optionally a non-transitory machine-readable storage medium, that optionally stores or otherwise provides an instruction that if and/or when executed by a processor, computer system, or other machine is operable to cause the machine to perform the method of any of Examples 10-13.

Example 32 is a computer system or other electronic device including an interconnect; a processor coupled with the interconnect; and at least one component coupled with the interconnect that is selected from a dynamic random access memory (DRAM), a graphics chip, a wireless communications chip, a phase change memory, and a video camera, the computer system or other electronic device operable to perform the method of any of Examples 10-13.

Example 33 is a processor or other apparatus that is operable to perform one or more operations or any method substantially as described herein.

Example 34 is a processor or other apparatus including means for performing one or more operations or any method substantially as described herein.

Example 35 is a processor or other apparatus to perform any of the instructions substantially as described herein.

Example 36 is a processor or other apparatus including means for performing any of the instructions substantially as described herein.

What is claimed is:

1. A processor comprising:
a decode unit to decode a return target restrictive return from procedure (RTR return) instruction;
a return target restriction unit, which includes at least some circuitry, coupled with the decode unit, and responsive to the RTR return instruction, to determine whether to restrict an attempt by the RTR return instruction to make a control flow transfer to an instruction at a return address corresponding to the RTR return instruction, based on compatibility of a type of the instruction at the return address with the RTR return instruction, and based on compatibility of first return target restrictive information (RTR information) of the RTR return instruction with second RTR information of the instruction at the return address; and
a control flow transfer unit coupled with the return target restriction unit and with the decode unit, the control flow transfer unit, responsive to the RTR return instruction, to transfer control flow to the instruction at the return address when the return target restriction unit determines not to restrict the attempt.

2. The processor of claim 1, wherein the return target restriction unit is to determine not to restrict the attempt when a first value corresponding to the first RTR information matches a second value corresponding to the second RTR information, and is to determine to restrict the attempt when the first value does not match the second value.

3. The processor of claim 2, wherein the return target restriction unit is to determine not to restrict the attempt when the first value equals the second value, and is to determine to restrict the attempt when the first value does not equal the second value.

4. The processor of claim 1, wherein the return target restriction unit is to determine to restrict the attempt when an opcode of the instruction at the return address is not one of a set of no more than five opcodes that correspond to all instructions that are of a type compatible with the RTR return instruction, and which are to be used to mark potentially allowable return targets for the RTR return instruction.

5. The processor of claim 1, wherein the RTR return instruction has an immediate to provide the first RTR information, and wherein the instruction at the return address has an immediate to provide the second RTR information.

6. The processor of claim 1, wherein, when the return target restriction unit determines not to restrict the attempt, the processor is to perform the instruction at the return address as a no operation.

7. The processor of claim 1, wherein, when the return target restriction unit determines to restrict the attempt, the return target restriction unit is to cause one of an exception, a fault, and an interrupt.

8. The processor of claim 1, wherein the decode unit is to decode the RTR return instruction which is to have an immediate and an opcode that is same as a legacy return from procedure instruction that existed in an instruction set before the RTR return instruction, wherein the legacy return from procedure instruction was originally to cause a number of bytes indicated by the immediate to be popped from a stack, and wherein the processor is to use the immediate for the first RTR information.

9. The processor of claim 1, wherein the decode unit is to decode the RTR return instruction which is to have an immediate and an opcode that is same as a legacy return from procedure instruction that existed in an instruction set before the RTR return instruction, and wherein the processor has a first mode in which the immediate is to correspond to the first RTR information and a second mode in which the immediate is to be ignored.

* * * * *